United States Patent
Zhao et al.

(10) Patent No.: US 12,439,368 B2
(45) Date of Patent: Oct. 7, 2025

(54) WIRELESS COMMUNICATION METHOD AND COMMUNICATIONS APPARATUS

(71) Applicant: QUECTEL WIRELESS SOLUTIONS CO., LTD., Shanghai (CN)

(72) Inventors: Zheng Zhao, Shanghai (CN); Ling Lyu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/757,423

(22) Filed: Jun. 27, 2024

(65) Prior Publication Data

US 2024/0349231 A1 Oct. 17, 2024

Related U.S. Application Data

(63) Continuation of application No. PCT/CN2021/142027, filed on Dec. 28, 2021.

(51) Int. Cl.
*H04W 64/00* (2009.01)
*H04L 5/00* (2006.01)
*H04W 68/02* (2009.01)

(52) U.S. Cl.
CPC ........... *H04W 64/00* (2013.01); *H04L 5/0051* (2013.01); *H04W 68/02* (2013.01)

(58) Field of Classification Search
CPC combination set(s) only.
See application file for complete search history.

(56) References Cited

U.S. PATENT DOCUMENTS

| | | | |
|---|---|---|---|
| 2018/0242275 A1 | 8/2018 | Militano et al. | |
| 2019/0182794 A1 | 6/2019 | Wong et al. | |
| 2023/0199692 A1* | 6/2023 | Ghosh | H04L 5/0094 |
| | | | 455/435.1 |

FOREIGN PATENT DOCUMENTS

| | | | |
|---|---|---|---|
| CN | 112399498 | 2/2021 | |
| CN | 113163476 | 7/2021 | |
| CN | 113366894 | 9/2021 | |
| CN | 114071670 A * | 2/2022 | ........ H04W 52/0212 |
| EP | 4412331 A1 | 8/2024 | |
| KR | 20140103490 | 8/2014 | |
| WO | WO 2020032749 | 2/2020 | |
| WO | WO 2020243265 | 12/2020 | |
| WO | WO 2021029934 A1 | 2/2021 | |

(Continued)

OTHER PUBLICATIONS

3GPP TS 38.133 V15.15.0, "3rd Generation Partnership Project; Technical Specification Group Radio Access Network; NR; Requirements for support of radio resource management (Release 15)," Sep. 2021, 1232 pages.

(Continued)

*Primary Examiner* — Muthuswamy G Manoharan
(74) *Attorney, Agent, or Firm* — Fish & Richardson P.C.

(57) ABSTRACT

Disclosed are a wireless communication method and a communications apparatus. The method includes: determining, by a positioning device in a core network, a first time period, where a time domain position of the first time period is associated with a time domain position of a second time period; and the first time period is associated with positioning measurement or sounding reference signal (SRS) transmission, and the second time period is associated with paging detection.

20 Claims, 6 Drawing Sheets

(56) References Cited

FOREIGN PATENT DOCUMENTS

WO     WO 2021185276 A1    9/2021
WO     WO 2021196099       10/2021

OTHER PUBLICATIONS

International Search Report and Written Opinion in International Appln. No. PCT/CN2021/142027, mailed on Sep. 27, 2022, 14 pages (with English translation).
Office Action in Chinese Appln. No. 202180016428.3, mailed on Sep. 20, 2024, 39 pages (with English machine translation).
Qualcomm Incorporated, "Paging monitoring in NR-U," 3GPP TSG-RAN WG2 Meeting #108, R2-1915011, Reno, NV, USA, Nov. 18-22, 2019, 3 pages.
Extended European Search Report in European Appln. No. 21969325.6, mailed on Jan. 14, 2025, 76 pages.
Moderator (Intel Corporation), "Feature Lead Summary#3 for E-mail Discussion [107-e-NR-ePos-06]," 3GPP TSG RAN WG1 #107, R1-2112571, e-Meeting, Nov. 11-19, 2021, 58 pages.
Vivo, "Discussion on potential positioning enhancements," 3GPP TSG RAN WG1 #103-e, R1-2007666, e-Meeting, Oct. 26-Nov. 13, 2020, 49 pages.

\* cited by examiner

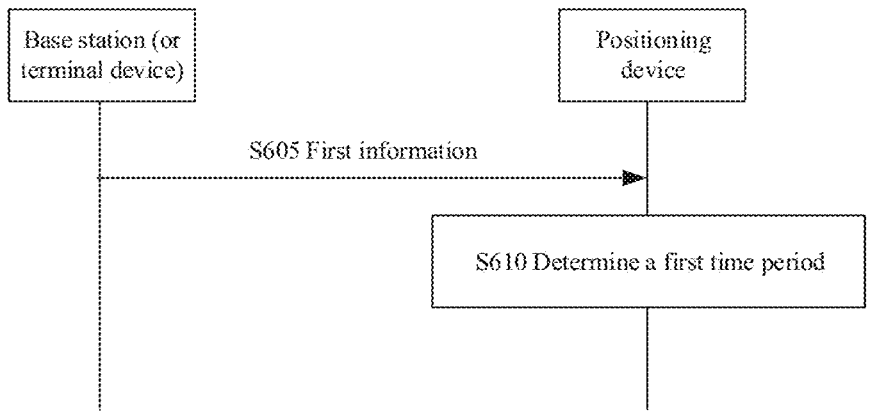
FIG. 6
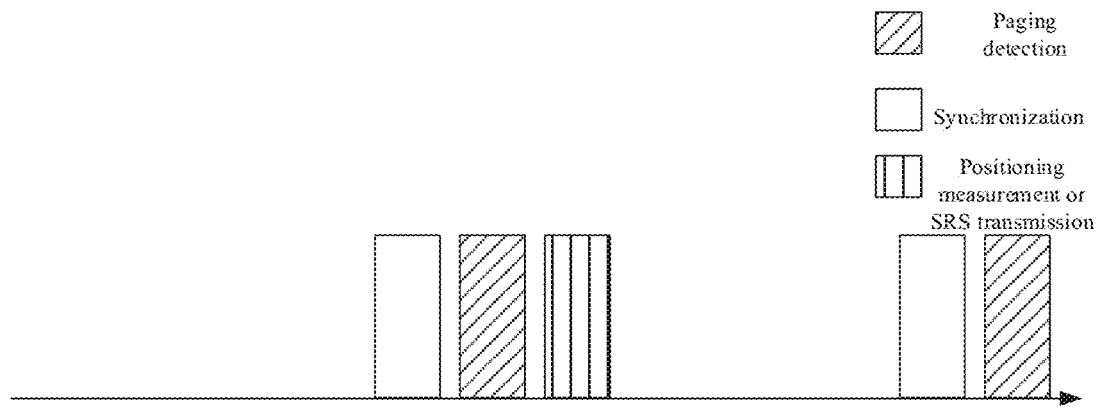
FIG. 7
If a time of positioning measurement overlaps with a detection time of a PEI, a terminal device performs the positioning measurement and/or detects the PEI — S810
FIG. 8
If a time of positioning measurement overlaps with a time of paging detection, a terminal device performs the positioning measurement and/or the paging detection — S910
FIG. 9
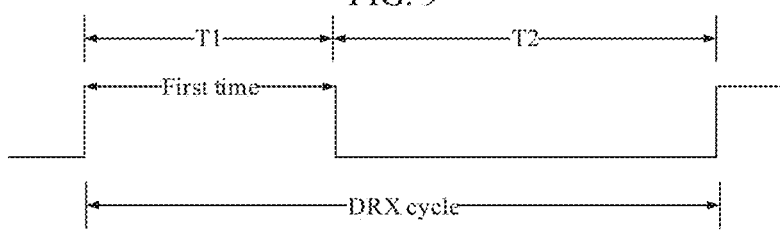
FIG. 10A

WIRELESS COMMUNICATION METHOD AND COMMUNICATIONS APPARATUS

CROSS-REFERENCE TO RELATED APPLICATIONS

The present application is a continuation of International Patent Application No. PCT/CN2021/142027, filed on Dec. 28, 2021, the disclosure of which is hereby incorporated by reference in its entirety.

TECHNICAL FIELD

The present application relates to the technical field of communications, and more specifically, to a wireless communication method and a communications apparatus.

BACKGROUND

When a terminal device is in a radio resource control (RRC) idle state or an RRC inactive state, the terminal device may perform positioning measurement or sounding reference signal (SRS) transmission, and may perform paging detection. How to coordinate the two is a problem that needs to be resolved urgently.

SUMMARY

In view of the foregoing problem, the present application provides a wireless communication method and a communications apparatus.

According to a first aspect, a wireless communication method is provided, including: determining, by a positioning device in a core network, a first time period, where a time domain position of the first time period is associated with a time domain position of a second time period; and the first time period is used by a terminal device to perform positioning measurement or SRS transmission, and the second time period is used by the terminal device to perform paging detection.

According to a second aspect, a wireless communication method is provided, including: transmitting, by a terminal device or a base station, first information to a positioning device in a core network, where the first information is used to determine a first time period, and a time domain position of the first time period is associated with a time domain position of a second time period; and the first time period is used by the terminal device to perform positioning measurement or SRS transmission, and the second time period is used by the terminal device to perform paging detection.

According to a third aspect, a wireless communication method is provided, including: if a time of positioning measurement overlaps with a detection time of a paging early indication (PEI), performing, by a terminal device, the positioning measurement and/or detecting of the PEI.

According to a fourth aspect, a wireless communication method is provided, including: if a time of positioning measurement overlaps with a detection time of a PEI, determining, by a base station, that a terminal device performs the positioning measurement and/or detects the PEI.

According to a fifth aspect, a wireless communication method is provided, including: if a time of positioning measurement overlaps with a time of paging detection, performing, by a terminal device, the positioning measurement and/or paging detection.

According to a sixth aspect, a wireless communication method is provided, including: if a time of positioning measurement overlaps with a time of paging detection, determining, by a base station, that a terminal device performs the positioning measurement and/or the paging detection.

According to a seventh aspect, a wireless communication method is provided, including: determining a first time within a first discontinuous reception (DRX) cycle, where the first time is predefined by a protocol or configured by a base station, and the first time is a time for positioning measurement performed by a terminal device.

According to an eighth aspect, a wireless communication method is provided, including: receiving, by a base station, a first message transmitted by a positioning device in a core network, where the first message includes one or more of following information: first information, including time information of positioning measurement by a terminal device; and second information, used to instruct the base station to disable a DRX mode of the terminal device, or instruct the base station to adjust configuration information of DRX of the terminal device.

According to a ninth aspect, a wireless communication method is provided, including: transmitting, by a positioning device in a core network, a first message to a base station, where the first message includes one or more of following information: first information, including time information of positioning measurement by a terminal device; and second information, used to instruct the base station to disable a DRX mode of the terminal device, or instruct the base station to adjust configuration information of DRX of the terminal device.

According to a tenth aspect, a communications apparatus is provided, where the communications apparatus is a positioning device in a core network, and the communications apparatus includes: a determining module, configured to determine a first time period, where a time domain position of the first time period is associated with a time domain position of a second time period; and the first time period is used by a terminal device to perform positioning measurement or SRS transmission, and the second time period is used by the terminal device to perform paging detection.

According to an eleventh aspect, a communications apparatus is provided, where the communications apparatus is a terminal device or a base station, and the communications apparatus includes: a communications module, configured to transmit first information to a positioning device in a core network, where the first information is used to determine a first time period, and a time domain position of the first time period is associated with a time domain position of a second time period; and the first time period is used by the terminal device to perform positioning measurement or SRS transmission, and the second time period is used by the terminal device to perform paging detection.

According to a twelfth aspect, a communications apparatus is provided, where the communications apparatus is a terminal device, and the communications apparatus includes: a control module, configured to: if a time of positioning measurement overlaps with a detection time of a PEI, control the terminal device to perform the positioning measurement and/or to detect the PEI.

According to a thirteenth aspect, a communications apparatus is provided, where the communications apparatus is a base station, and the communications apparatus includes: a determining module, configured to: if a time of positioning measurement overlaps with a detection time of a PEI, determine that a terminal device performs the positioning measurement and/or detects the PEI.

According to a fourteenth aspect, a communications apparatus is provided, where the communications apparatus is a terminal device, and the communications apparatus includes: a control module, configured to: if a time of positioning measurement overlaps with a time of paging detection, control the terminal device to perform the positioning measurement and/or the paging detection.

According to a fifteenth aspect, a communications apparatus is provided, where the communications apparatus is a base station, and the communications apparatus includes: a determining module, configured to: if a time of positioning measurement overlaps with a time of paging detection, determine that a terminal device performs the positioning measurement and/or the paging detection.

According to a sixteenth aspect, a communications apparatus is provided, including: a determining module, configured to determine a first time within a first DRX cycle, where the first time is predefined by a protocol or configured by a base station, and the first time is a time for positioning measurement performed by a terminal device.

According to a seventeenth aspect, a communications apparatus is provided, where the communications apparatus is a base station, and the communications apparatus includes: a communications module, configured to receive a first message transmitted by a positioning device in a core network, where the first message includes one or more of following information: first information, including time information of positioning measurement by a terminal device; and second information, used to instruct the base station to disable a DRX mode of the terminal device, or instruct the base station to adjust configuration information of DRX of the terminal device.

According to an eighteenth aspect, a communications apparatus is provided, where the communications apparatus is a positioning device in a core network, and the communications apparatus includes: a communications module, configured to transmit a first message to a base station, where the first message includes one or more of following information: first information, including time information of positioning measurement by a terminal device; and second information, used to instruct the base station to disable a DRX mode of the terminal device, or instruct the base station to adjust configuration information of DRX of the terminal device.

According to a nineteenth aspect, a communications apparatus is provided, including a memory and a processor, where the memory is configured to store a program, and the processor is configured to invoke the program in the memory, to perform the method according to any one of the first aspect to the ninth aspect.

According to a twentieth aspect, an apparatus is provided, including a processor, where the processor is configured to invoke a program from a memory, to perform the method according to any one of the first aspect to the ninth aspect.

According to a twenty-first aspect, a chip is provided, including a processor, where the processor is configured to invoke a program from a memory, so that a device on which the chip is installed performs the method according to any one of the first aspect to the ninth aspect.

According to a twenty-second aspect, a computer-readable storage medium is provided, where the computer-readable storage medium stores a program that enables a computer to perform the method according to any one of the first aspect to the ninth aspect.

According to a twenty-third aspect, a computer program product is provided, including a program that enables a computer to perform the method according to any one of the first aspect to the ninth aspect.

According to a twenty-fourth aspect, a computer program is provided, where the computer program enables a computer to perform the method according to any one of the first aspect to the ninth aspect.

BRIEF DESCRIPTION OF THE DRAWINGS

FIG. 6 is a schematic flowchart of a wireless communication method according to Embodiment 1.

FIG. 7 is an example diagram of a possible implementation of the method shown in FIG. 6.

FIG. 8 is a schematic flowchart of a wireless communication method according to Embodiment 2.

FIG. 9 is a schematic flowchart of a wireless communication method according to Embodiment 3.

FIG. 10A is an example diagram of a relationship between a first time (a time of positioning measurement) and a DRX cycle according to Embodiment 4.

DETAILED DESCRIPTION OF THE EMBODIMENTS

Communications System

Figure 1:
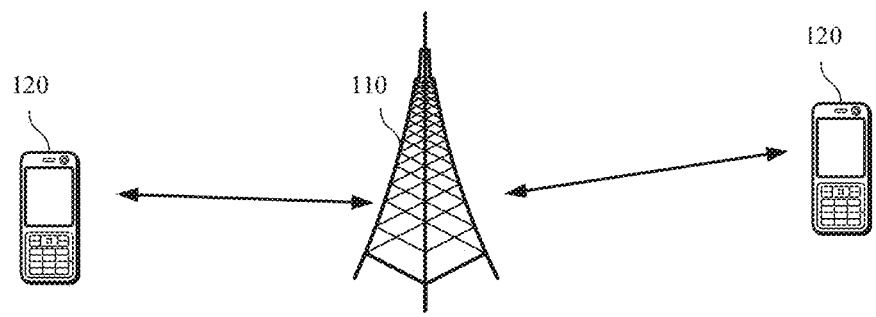
FIG. 1 is a diagram of a system architecture of a communications system to which an embodiment of the present application is applicable.

FIG. 1 shows a wireless communications system 100 to which an embodiment of the present application is applicable. The wireless communications system 100 may include a base station 110 and a terminal device 120. The base station 110 may be a device in communication with the terminal device 120. The base station 110 may provide communication coverage for a specific geographic area, and may communicate with the terminal device 120 located within the coverage.

FIG. 1 exemplarily shows one base station and two terminals. Optionally, the wireless communications system 100 may include a plurality of base stations, and another quantity of terminal devices may be included in coverage of each base station. This is not limited in embodiments of the present application.

Optionally, the wireless communications system 100 may further include other network entities such as a network controller and a mobility management entity. This is not limited in embodiments of the present application.

It should be understood that technical solutions of embodiments of the present application may be applied to various communications systems, such as a $5^{th}$ generation (5G) system or new radio (NR), a long term evolution (LTE) system, an LTE frequency division duplex (FDD) system, and LTE time division duplex (TDD). The technical solutions provided in the present application may further be applied to a future communications system, such as a $6^{th}$ generation mobile communications system or a satellite communications system.

The terminal device in embodiments of the present application may alternatively be referred to as a user equipment (UE), an access terminal, a subscriber unit, a subscriber station, a mobile site, a mobile station (MS), a mobile terminal (MT), a remote station, a remote terminal, a mobile device, a user terminal, a terminal, a wireless communications device, a user agent, a user apparatus, or the like. The terminal device in embodiments of the present application may be a device providing a user with voice and/or data connectivity and capable of connecting people, objects, and machines, such as a handheld device or in-vehicle device having a wireless connection function. The terminal device in embodiments of the present application may be a mobile phone, a tablet computer (pad), a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. Optionally, the UE may be used to act as a base station. For example, the UE may act as a scheduling entity, and provides a sidelink signal between UEs in V2X, D2D, or the like. For example, a cellular phone and a vehicle communicate with each other by using a sidelink signal. A cellular phone and a smart home device communicate with each other, without relaying a communication signal by using a base station.

The base station in embodiments of the present application may be a device for communicating with the terminal device. The base station may alternatively be referred to as an access network device or a wireless access network device. The base station in embodiments of the present application may be a radio access network (RAN) node (or device) that connects the terminal device to a wireless network. The base station may broadly cover following various names, or may be replaced with following names, such as a NodeB, an evolved NodeB (eNB), a next generation NodeB (gNB), a relay station, an access point, a transmitting and receiving point (TRP), a transmitting point (TP), a master eNode MeNB, a secondary eNode SeNB, a multi-standard radio (MSR) node, a home base station, a network controller, an access node, a radio node, an access point (AP), a transmission node, a transceiver node, a baseband unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in device to device (D2D), vehicle-to-everything (V2X), and machine-to-machine (M2M) communications, a network-side device in a 6G network, a device that functions as a base station in a future communications system, or the like. The base station may support a network with a same access technology or different access technologies. A specific technology and a specific device form used by the base station are not limited in embodiments of the present application.

The base station may be fixed or mobile. For example, a helicopter or an unmanned aerial vehicle may be configured to act as a mobile base station, and one or more cells may move according to a position of the mobile base station. In another example, a helicopter or an unmanned aerial vehicle may be configured to serve as a device in communication with another base station.

In some deployments, the base station in embodiments of the present application may be a CU or a DU, or the base station includes a CU and a DU. The gNB may further include an AAU.

The base station and the terminal device may be deployed on land, including being indoors or outdoors, handheld, or in-vehicle, may be deployed on a water surface, or may be deployed on a plane, a balloon, or a satellite in the air. In embodiments of the present application, scenarios in which the base station and the terminal device are located are not limited.

Positioning Technology in the Communications System

Figure 2:
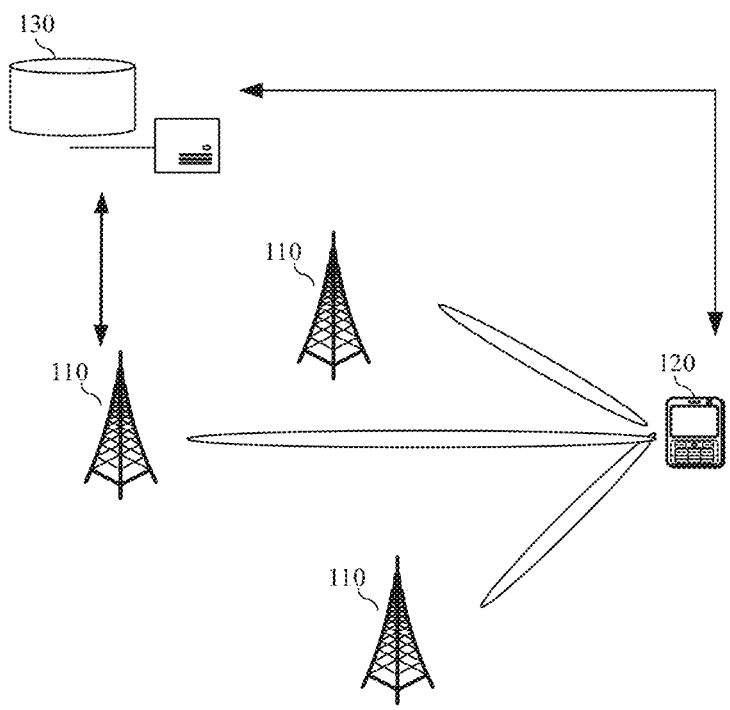
FIG. 2 is a schematic diagram of performing positioning measurement based on the communications system shown in FIG. 1.

As shown in FIG. 2, a communications system 100 may further include a positioning device 130. The positioning device 130 may be configured to determine location information of a terminal device. The positioning device 130 may be located in a core network. Sometimes, the positioning device 130 may alternatively be referred to as a positioning server. An NR system is used as an example, and the positioning device 130 may be a location management function (LMF). Another communications system is used as an example, and the positioning device 130 may be a location management unit (LMU), a location management center (LMC), or an evolved serving mobile location center (E-SMLC). It may be understood that, the positioning device 130 may alternatively be another network element, node, or device for determining the location information of the terminal device, for example, may be a network element or node in a future communications system for determining the location information of the terminal device. A name of the positioning device is not specifically limited in embodiments of the present application.

Positioning in the communications system 100 includes uplink positioning and downlink positioning. In some communications systems (for example, the NR system), downlink positioning is performed based on a positioning reference signal (PRS). The PRS, alternatively referred to as a downlink positioning reference signal (DL-PRS), is a reference signal for a positioning function. For example, in a downlink positioning process, a terminal device 120 may first measure a PRS transmitted by a serving cell and a neighboring cell (or a neighbor cell), and estimate related information of positioning measurement. Then the terminal device 120 may report, to the positioning device 130, the related information of the positioning measurement as a measurement result of the PRS. The positioning device 130 may calculate a location of the terminal device 120 based on the related information that is of the positioning measurement and that is reported by the terminal device 120, to obtain the location information of the terminal device 120. For example, the positioning device 130 may calculate the location information of the terminal device 120 based on a trilateration method or a triangulation method.

In some communications systems (for example, the NR system), uplink positioning is performed based on an SRS. For example, in an uplink positioning process, the terminal device 120 transmits an SRS. A base station 110 (a base station of a serving cell and a base station of a neighboring cell) may obtain a measurement result based on the SRS transmitted by the terminal. The measurement result of the SRS may include related information of positioning measurement. The base station 110 may then transmit the related information of the positioning measurement to the positioning device 130. The positioning device 130 may calculate a location of the terminal device 120 based on the related information that is of the positioning measurement and that is reported by the base station 110, to obtain the location information of the terminal device 120. For example, the positioning device 130 may calculate the location information of the terminal device 120 based on a trilateration method or a triangulation method.

The related information of the positioning measurement may include one or more of the following information: time information, distance information, power information, and angle information. More specifically, the related information of the positioning measurement may include one or more of the following information: a time difference of arrival (time difference of arrival, TDOA), an angle difference of arrival (ADOA), a reference signal received power (RSRP), and the like.

DRX Mode

Figure 3:
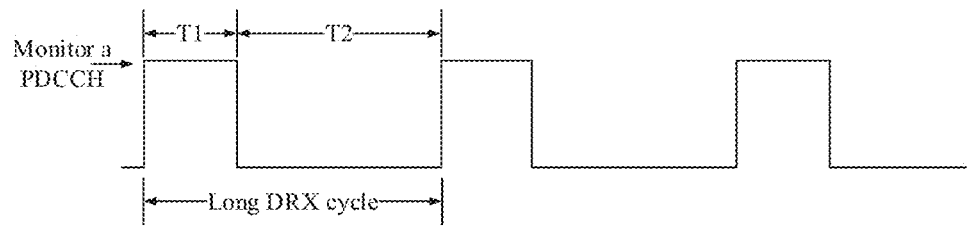
FIG. 3 is a schematic diagram of a DRX cycle.
Figure 3:
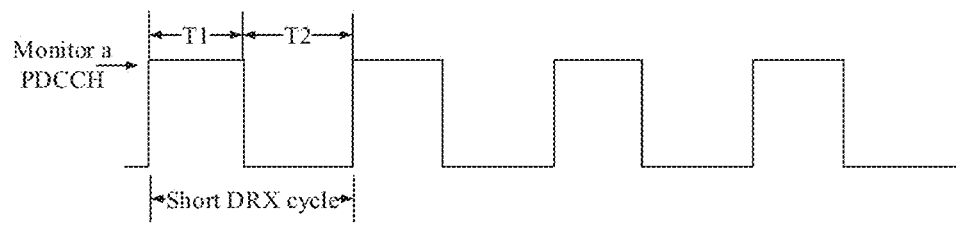

FIG. 3 is a schematic diagram of a DRX cycle. As shown in FIG. 3, T1 is a wake-up time of a terminal device, or is referred to as DRX on duration. T2 is a sleep time of the terminal device, or is referred to as an opportunity for DRX.

A time length of the wake-up time of the terminal device may be controlled by a DRX on duration timer (drx-onDurationTimer). Timing duration of the DRX on duration timer is T1. The terminal device needs to continuously monitor a physical downlink control channel (PDCCH) within the wake-up time T1, and may not monitor the PDCCH within the sleep time T2. It may be understood that longer T2 leads to lower power consumption of the terminal device.

It may be seen from FIG. 3 that, for a long DRX cycle (long DRX cycle), a wake-up frequency of the terminal device is relatively low, which saves more power for the terminal device; and for a short DRX cycle, a wake-up frequency of the terminal device is relatively high, which increases power consumption of the terminal device, but a probability of successfully scheduling the terminal device by a base station may be increased, thereby reducing a data transmission delay.

Each medium access control (MAC) entity corresponds to a DRX configuration. The DRX configuration may include the DRX on duration timer described above. In addition, another DRX timer may further be included in the DRX configuration to jointly adjust the wake-up time of the terminal device.

The another DRX timer mentioned herein may include, for example, one or more of the following timers: a DRX inactivity timer (drx-InactivityTimer), a short DRX cycle timer (drx-ShortCycleTimer), a DRX downlink retransmission timer (drx-RetransmissionTimerDL), and a DRX downlink hybrid automatic repeat request (HARQ) round-trip time (RTT) timer (HARQ-RTT-TimerDL).

The DRX inactivity timer may indicate duration for which a terminal device needs to perform monitoring after the terminal device successfully detects a PDCCH. The short DRX cycle timer may indicate duration for which a terminal device follows a short DRX cycle. The DRX downlink retransmission timer may be used by a terminal device to receive downlink retransmission scheduling. The timer may indicate duration for which the terminal device needs to continuously perform monitoring to receive desired downlink retransmission scheduling. The DRX downlink hybrid automatic repeat request RTT timer (HARQ-RTT-TimerDL) is used by a terminal device to receive downlink retransmission scheduling, indicating duration for which the terminal device needs to wait before receiving desired downlink retransmission scheduling.

In addition, a base station may configure other DRX parameters for the terminal device, such as a short DRX cycle, a long DRX cycle, a DRX start subframe offset (drx-LongCycleStartOffset), and a DRX slot offset (drx-SlotOffset); and configure other DRX timers, such as a random access contention resolution timer (ra-ContentionResolutionTimer), a DRX uplink retransmission timer (drx-RetransmissionTimerUL), and a DRX uplink HARQ round-trip time timer (HARQ-RTT-TimerUL).

In a DRX mechanism, a configuration of a long DRX cycle may be a default configuration, and a configuration of a short DRX cycle may be an optional configuration. For a terminal device configured with a short DRX cycle, conversion between the long DRX cycle and the short DRX cycle may be performed in a following manner.

When any one of the following conditions is met, the terminal device uses the short DRX cycle: 1. the DRX inactivity timer (drx-InactivityTimer) expires; 2. the terminal device receives a DRX command MAC CE (DRX Command MAC CE).

When any one of the following conditions is met, the terminal device uses the long DRX cycle: 1. the short DRX cycle timer (Drx-shortCycleTimer) expires; 2. the terminal device receives a long DRX command MCA CE (long DRX command MAC CE).

No matter the long DRX cycle or the short DRX cycle is used, if one or more of the following cases occur, the terminal device is in a DRX active state (sometimes also referred to as a DRX on state), and a time corresponding to the DRX active state may be referred to as a DRX active time.

Case 1: Any one of the DRX on duration timer, the DRX inactivity timer, the DRX downlink retransmission timer, the DRX uplink retransmission timer, and the random access contention resolution timer is running.

Case 2: The terminal device transmits a scheduling request (SR) on a PUCCH and makes the SR pending.

Case 3: A HARQ buffer of the terminal device has data and waits for an uplink grant (UL grant) for HARQ retransmission.

Case 4: The terminal device successfully receives a random access response (RAR) that responds to a preamble not selected by a MAC entity, but does not receive a PDCCH indicating an initial transmission and using a cell radio network temporary identifier (C-RNTI) of the MAC entity.

In a DRX cycle, except for the DRX active time, a remaining time may be referred to as an inactive time or a sleep time of DRX. During the sleep time, the terminal device is in a sleep state (sometimes also referred to as a DRX off state).

Positioning in a DRX Mode

When a terminal device is in a sleep state, a current protocol specifies that the terminal device is not allowed to transmit a periodic SRS or a semi-persistent SRS (semi-persistent SRS), but may transmit an aperiodic SRS. In addition, when the terminal device is in the sleep state, the terminal device is not restricted to measure a PRS in the current protocol. It may be seen that even in the sleep state, the terminal device may transmit an SRS (for example, the aperiodic SRS) for uplink positioning, or may measure a PRS for downlink positioning. Therefore, according to the current protocol, the DRX mode and uplink/downlink positioning are designed independently of each other. In other words, currently, a positioning process of a communications system is not designed from an energy saving perspective. An independent design of the DRX mode and positioning measurement may cause a communication problem, such as a power consumption problem or a delay problem. Therefore, how to coordinate the DRX mode and the positioning measurement is a problem that needs to be resolved urgently. The foregoing problem is resolved from different angles with reference to a plurality of embodiments.

RRC Status

Some communications systems (for example, an NR system) introduce three states for RRC: an RRC idle state (RRC_IDLE state), an RRC inactive state (RRC_INACTIVE state), and an RRC connected state (RRC_CONNECTED state). The foregoing three states reflect a connection status of a terminal device, a base station and a core network.

A terminal device in the RRC idle state has no RRC context on a network side, that is, a parameter required for communication between the network side and the terminal device does not belong to a specific cell, and the network side also does not learn whether the terminal device exists. A group of tracking area identifier (TAI) lists is allocated to the terminal device. From a perspective of the core network, a radio access network side is disconnected from the core network. To reduce power consumption, the terminal device is in a sleep state in most of time, and therefore, cannot perform data transmission. In a downlink, a terminal device in the RRC idle state may be periodically woken up to receive a paging message (if any) from the network side. Mobility may be processed by the terminal device through cell reselection. In the RRC idle state, the terminal device and the network side do not maintain uplink synchronization. If the terminal device needs to switch from the RRC idle state to the RRC connected state, RRC contexts can be established in the terminal device and on the network side only through random access.

In the RRC connected state, the RRC context may be established, and all parameters required for communication are known to both entities (the terminal device and the network side). From a perspective of the core network, the terminal device is in a state of being connected to the core network. A cell to which the terminal device belongs is known and has been configured with a device identity, namely, C-RNTI, for signalling transmission between the terminal device and a network. Data may be transmitted in the RRC connected state; however, because a data flow usually bursts, when there is no data flow for transmission, power consumption may be reduced by turning off a receiving circuit of the terminal device, and a DRX technology is used. Because an RRC context has been established in the base station in the connected state, leaving DRX and starting to receive/transmit data are relatively fast. In the connected state, mobility may be controlled by the network side, that is, the terminal device provides neighboring cell measurement for the network, and the network instructs the device to perform switching. Uplink time synchronization may or may not be present. When there is data for transmission, uplink synchronization may be established through random access.

In LTE, only the RRC idle state and the RRC connected state are supported. It is common in practice to use the RRC idle state as a primary sleep state of the terminal device to save power. However, because frequent transmission of small data packets often occurs on some terminal devices, there may be a large quantity of switching from the RRC idle state to the RRC connected state in the LTE mode. The switching causes an increase in a signalling load and a signalling delay. Therefore, to reduce the signalling load and a waiting time, an RRC inactive state is introduced in NR.

In the RRC inactive state, RRC contexts are maintained on the network side and a terminal device side. From the perspective of the core network, a RAN side is connected to the core network. Therefore, switching from the inactive state to the connected state is very fast, and core network signalling is not required. In addition, the terminal device is allowed to sleep in a manner similar to the idle state, and mobility is processed through cell reselection. Therefore, the RRC inactive state may be considered as a mixture of the idle state and the connected state. In addition, the terminal device may perform the positioning measurement mentioned above in the RRC inactive state. When the positioning measurement is performed in the RRC inactive state, the terminal device does not need to switch to the RRC connected state, so that overheads and a delay may be reduced.

As may be seen from the foregoing descriptions, an important difference between different RRC states lies in different mobility mechanisms. Efficient mobility processing is a key part of any mobile communications system. For the RRC idle state and the RRC inactive state, mobility is processed by the terminal device through cell reselection, while for the RRC connected state, mobility is processed by the network side based on measurement of the terminal device.

Paging Detection

Figure 4:
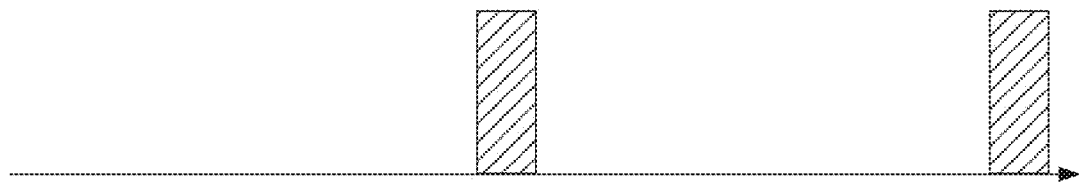
FIG. 4 is a schematic diagram of a paging cycle and paging detection.

When a terminal device is in an RRC idle state and/or an RRC inactive state, the terminal device may perform paging detection (also referred to as detecting of a paging occasion or detecting of a paging message) based on a specific paging cycle, as shown in FIG. 4.

In some communications systems (for example, NR Rel-17), a PEI is introduced for the RRC idle state and the RRC inactive state. The PEI indicates whether the terminal device has a paging message for the terminal device in a subsequent paging cycle. If the PEI indicates that there is no paging message in the subsequent paging cycle, the terminal device may continue entering a sleep state without waking up.

Embodiment 1

As mentioned above, in a current communications system, if a terminal device detects no paging message for the terminal device when detecting a paging occasion, the terminal device enters a sleep state. After the terminal device enters the sleep state, if a base station configures the terminal device to perform positioning measurement or SRS (for example, an SRS for positioning) transmission, the terminal device needs to wake up from a deep sleep state, performs uplink or downlink synchronization, and then performs the positioning measurement or the SRS transmission. After completing the SRS transmission, the terminal device enters the sleep state again.

For a positioning service request whose delay requirement is not high, it may take several paging cycles to complete positioning measurement corresponding to the positioning service request. In this case, the terminal device may need to frequently switch among the following states: wake up-positioning measurement-sleep-wake up-paging detection-sleep.

Figure 5:
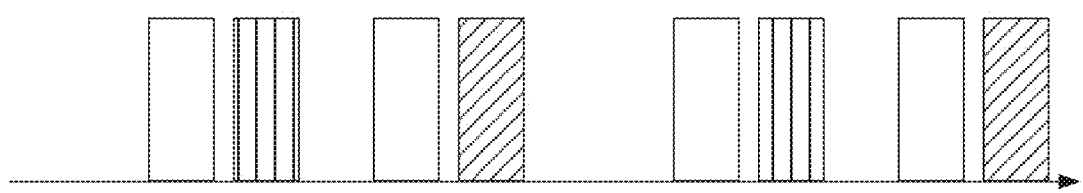
FIG. 5 is a schematic diagram of performing positioning measurement or SRS transmission within a paging cycle.

As shown in FIG. 5, the terminal device may perform paging detection in each paging cycle. Synchronization (or referred to as synchronization detection) is performed before the paging detection. Before preparing to perform the positioning measurement or the SRS transmission, the terminal device is in an out-of-synchronization status again. In this case, the terminal device needs to perform synchronization again. It can be seen that the terminal device performs additional synchronization for the positioning measurement, which brings power consumption.

The power consumption caused by the synchronization of the terminal device is analyzed in more detail below.

When the terminal device is in the sleep state, most of components of the terminal device are turned off, and the terminal device needs to adjust each component (that is, preheat each component), to prepare for data reception. For example, the terminal device needs to use a reference timing clock of a local oscillator for automatic gain control (AGC), cell search, and timing collection. However, the terminal device is in the sleep state for a long time, the local oscillator of the terminal device is in a free-running state, and frequency stability of downlink reception has not been calibrated. Therefore, the reference timing clock of the local oscillator needs to be calibrated by using a received signal, and a time offset and a frequency offset are finely tuned, to calibrate the frequency drift of the local oscillator to achieve a frequency stability requirement of 0.1 ppm. The local oscillator free-runs during deep sleep of the terminal device, and consequently, a relatively large frequency drift is caused. Therefore, the terminal device must prepare for frequency tuning based on a frequency drift of 5 ppm. Based on a power analysis of a terminal vendor, synchronization after the deep sleep brings relatively high power consumption.

In view of the foregoing problem, Embodiment 1 is described in detail below with reference to FIG. 6.

FIG. 6 is a schematic flowchart of a wireless communication method according to Embodiment 1. The method in FIG. 6 is described from a perspective of interaction between a positioning device in a core network and a base station (or a terminal device). For example, the terminal device may be a terminal device in an RRC idle state or an RRC inactive state. For example, the base station may be a gNB, and the positioning device in the core network may be an LMF.

As shown in FIG. 6, in Step S610, the positioning device in the core network determines a first time period. The first time period may be used by the terminal device to perform positioning measurement or SRS transmission. The SRS is an SRS for positioning. The SRS may include an aperiodic SRS and/or a periodic SRS.

A time domain position of the first time period may be associated with a time domain position of a second time period (a time period for performing paging detection by the terminal device). For example, the first time period may partially or completely overlap with the second time period. For another example, the first time period may be located adjacent to the second time period (in other words, the first time period is at a location close to the second time period).

For example, that the first time period is located adjacent to the second time period may be: The first time period is as close as possible to the second time period, so that the terminal device successively completes the positioning measurement (or the SRS transmission) and the paging detection when being not out-of-synchronization thereby reducing power consumption of the terminal device.

In some embodiments, the first time period may be located before the second time period; or, in some other embodiments, the first time period may be located after the second time period.

In some embodiments, the first time period and the second time period may form a continuous time period.

In some embodiments, a time interval between the first time period and the second time period is less than or equal to a first threshold.

The time interval between the first time period and the second time period may be defined in various manners. The time interval between the first time period and the second time period is one of the following time intervals: a time interval between a starting time of the first time period and a starting time of the second time period; a time interval between the starting time of the first time period and an ending time of the second time period; a time interval between an ending time of the first time period and the starting time of the second time period; and a time interval between the ending time of the first time period and the ending time of the second time period.

In some embodiments, the first threshold mentioned above may be predefined by a protocol. Alternatively, the first threshold may be determined based on a time that the terminal device enters an out-of-synchronization status from a synchronization status. For example, the time that the terminal device enters the out-of-synchronization status from the synchronization status may be transmitted by the terminal device to the positioning device. For example, the terminal device may transmit the time that the terminal device enters the out-of-synchronization status from the synchronization status to the positioning device by using LTE positioning protocol (LPP) signalling.

In some embodiments, the first threshold may be less than or equal to: $\alpha T/N+\sigma$, where T is a paging cycle, N is a quantity of paging frames in one paging cycle, and T/N represents an interval between adjacent paging frames; and $\alpha=1$ or $\alpha$ is predefined by a protocol or $\alpha$ is a predefined higher layer parameter; and $\sigma=0$ or $\sigma$ is predefined by a protocol or $\sigma$ is a predefined higher layer parameter. In an example, the first threshold is less than T/N, where T/N is an interval between adjacent paging frames. When the first threshold is defined by using a paging frame interval, the first threshold may be indicated by using relatively few bits, thereby reducing signalling overheads required for indicating the first threshold.

As shown in FIG. 7, a time period for positioning measurement or SRS transmission may be set after a time period for paging detection and very close to the time period for the paging detection. In this way, after performing the paging detection, the terminal device may directly perform the positioning measurement or the SRS transmission when being not out-of-synchronization. Certainly, the time period for positioning measurement or SRS transmission may alternatively be set before a time period for paging detection and very close to the time period for the paging detection. In this way, after performing the positioning measurement or the SRS transmission, the terminal device may directly perform the paging detection when being not out-of-synchronization.

As shown in FIG. 6 again, in some embodiments, before Step S610, the positioning device in the core network may perform Step S605, that is, receiving first information from the base station or the terminal device (in some embodiments, the first information may alternatively be provided by another device in the core network except the positioning device). The first time period mentioned above may be determined based on the first information.

In some embodiments, the first information may include second information associated with the paging detection. That is, the terminal device or the base station may transmit information associated with the paging detection to the positioning device, and the positioning device determines the time period for the paging detection by the terminal device. After determining the time period for the paging detection, the positioning device may configure the time period for the positioning measurement or the SRS transmission based on the time period for the paging detection, so that the two time periods generate a previously mentioned association relationship (for example, a distance between the two time periods in time domain is set to be very short).

In an example, the second information may include one or more of the following parameters: a paging cycle, a DRX cycle of the terminal device (which may be a DRX cycle specific to the terminal device), a frame offset of a paging frame (PF_offset), a quantity of paging frames included in the paging cycle, and an identity of the terminal device. All the above parameters may be notified by using higher layer signalling.

In another example, the second information may include one or more of the following parameters: a position of a paging frame and a position of a paging occasion. The above parameters may be determined or derived based on parameters notified by using higher layer signalling (for example, the parameters listed in the previous example).

In still another example, the second information may include the time that the terminal device enters the out-of-synchronization status from the synchronization status.

In some embodiments, the first information may include third information. The third information indicates the time period that can be used for positioning measurement or SRS transmission. For example, the third information may include a starting point and/or a length of the time period that can be used for the positioning measurement or the SRS transmission. That is, the terminal device or the base station may actively determine, based on the time period for the paging detection, the time period that can be used for the positioning measurement or the SRS transmission. Then, the positioning device configures the period for the positioning measurement or the SRS transmission in the time period indicated by the third information.

In some embodiments, after determining the first time period, the positioning device may transmit configuration information of a PRS or configuration information of the SRS for positioning to the terminal device, so that the terminal device performs the positioning measurement or the SRS transmission.

Embodiment 2

As mentioned above, a terminal device detects a PEI before performing paging detection. However, if a time of positioning measurement conflicts with a time of PEI detection (that is, a time of the positioning measurement overlaps with a detection time of the PEI), a current protocol does not specify how to process the conflict. This may reduce communication reliability. The terminal device and a base station do not learn what to do in case of the conflict. If a standard protocol does not provide a clear processing manner, both the terminal device and the base station perform processing according to their own settings, and the terminal device and the base station are inconsistent in their implementation. For example, during the positioning measurement, the terminal device does not detect a PDCCH. If the time of the positioning measurement conflicts with the detection time of the PEI, and the terminal device chooses to perform the positioning measurement, the terminal device cannot complete detecting of the PEI. If the PEI indicates the terminal device to perform the paging detection in a subsequent paging cycle, but the terminal device has not completed detecting of the PEI, and thus the paging detection may not be performed in the subsequent paging cycle, resulting in an inconsistency between a behavior of the terminal device and the indication of the PEI. However, the base station schedules a paging message for the terminal device in the subsequent paging cycle, thereby reducing system efficiency and increasing a paging delay.

To resolve the above problem, Embodiment 2 is described in detail below with reference to FIG. 8.

FIG. 8 is a schematic flowchart of a wireless communication method according to Embodiment 2. The method in FIG. 8 is described from a perspective of a terminal device, and the terminal device may be in an RRC idle state or an RRC inactive state.

As shown in FIG. 8, in Step S810, if a time of positioning measurement overlaps with a detection time of a PEI, the terminal device performs the positioning measurement and/or detects the PEI. Correspondingly, a base station may also process the conflict according to same logic. Specifically, if the time of the positioning measurement overlaps with the detection time of the PEI, the base station may determine that the terminal device performs the positioning measurement and/or detects the PEI.

When the time of the positioning measurement conflicts with the detection time of the PEI, a behavior of the terminal device is clarified in this embodiment of the present application, thereby improving communication reliability.

The detection time of the PEI may be a detection occasion of the PEI (or a time corresponding to a detection occasion of the PEI). In some embodiments, the detection time of the PEI may be a time constituted by all detection occasions of the PEI. Specifically, before one paging cycle, there may be one or more detection occasions of the PEI corresponding to the paging cycle (the so-called PEI corresponding to the paging cycle is: The PEI is used to indicate whether there is a paging message corresponding to the terminal device in the paging cycle). The detection occasion of the PEI mentioned in this embodiment of the present application may be a time jointly constituted by all detection occasions of the PEI before one paging cycle. Different detection occasions of one PEI may be discontinuous in time domain. In some embodiments, "the time constituted by all detection occasions of the PEI" may include only a time corresponding to each of all the detection occasions of the PEI, and the time may be discontinuous. In some other embodiments, "the time constituted by all detection occasions of the PEI" may be a period of continuous time from the earliest detection occasion to the latest detection occasion in all the detection occasions of the PEI.

In some embodiments, the detection time of the PEI may be one of all the detection occasions of the PEI. In this case, Step S810 may be understood as: determining whether the time of the positioning measurement overlaps with each detection occasion of the PEI; and if the time of the positioning measurement overlaps with a detection occasion of the PEI, performing the positioning measurement and/or detecting the PEI on the detection occasion of the PEI. That is, Step S810 is performed a plurality of times, to perform conflict determining on all the detection occasions of the PEI one by one to determine an operation that the terminal device needs to perform on each detection occasion of the PEI.

Optionally, "that the terminal device performs the positioning measurement and/or detects the PEI" is determined based on a priority of the positioning measurement. For example, if the priority of the positioning measurement meets a first condition, the terminal device performs the positioning measurement, and skips detecting of the PEI. For another example, if the priority of the positioning measurement does not meet a first condition, the terminal device detects the PEI, and skips the positioning measurement. The first condition mentioned herein may be set depending on an actual situation. For example, the first condition may be that the priority of the positioning measurement is greater than or equal to a threshold. For another example, the first condition may be that the priority of the positioning measurement is greater than a priority corresponding to the PEI. The priority corresponding to the PEI may be defined by, for example, a priority of paging in a paging cycle indicated by the PEI, and the priority of the paging may be defined based on, for example, a type of a paging service.

In some embodiments, if the time of the positioning measurement overlaps with the detection time of the PEI, and the terminal device performs the positioning measurement and skips detecting of the PEI, the terminal device may perform paging detection in the paging cycle indicated by the PEI. If the terminal device performs the positioning measurement, the terminal device cannot detect the PEI when the positioning measurement conflicts with detecting of the PEI. If the PEI indicates the terminal device to perform the paging detection in a subsequent paging cycle, the terminal device cannot learn this information. To avoid occurrence of such a situation, in this embodiment, the terminal device is required to directly perform the paging detection in the paging cycle indicated by the PEI, to ensure communication reliability.

In some embodiments, a following behavior of the terminal device is predefined by a protocol: performing, by the terminal device, the positioning measurement, and skipping detecting of the PEI; and/or if the terminal device performs the positioning measurement, and skips detecting of the PEI, performing, by the terminal device, the paging detection in the paging cycle indicated by the PEI.

In some embodiments, if the time of the positioning measurement overlaps with the detection time of the PEI, the terminal device may alternatively be required to perform both the paging detection and the positioning measurement.

In some embodiments, before Step S810, the terminal device may first receive configuration information of the PEI and configuration information of the positioning measurement.

Embodiment 3

The problem of the conflict between the time of the positioning measurement and the detection time of the PEI is resolved in Embodiment 2. In fact, the time of the positioning measurement may also conflict with a time of paging detection. Similarly, if the time of the positioning measurement conflicts with the time of the paging detection (that is, the time of the positioning measurement overlaps with the time of the paging detection), and a terminal device performs the positioning measurement, the terminal device cannot perform the paging detection. In contrast, if the terminal device performs the paging detection, the terminal device cannot perform the positioning measurement. A current protocol does not specify how to process the conflict. When the terminal device and a base station encounter such a situation, the terminal device and the base station do not learn how to process the situation. Therefore, the terminal device and the base station may be inconsistent in their implementation. For example, in a case of a conflict, the base station performs processing based on that the terminal device performs the positioning measurement, and therefore, does not schedule a paging signal. However, the terminal device does not perform the positioning measurement, but performs the paging detection. This causes the terminal device to wake up in vain and to waste power consumption for the paging detection.

To resolve the above problem, Embodiment 3 is described in detail below with reference to FIG. 9.

FIG. 9 is a schematic flowchart of a wireless communication method according to Embodiment 3. The method in FIG. 9 is described from a perspective of a terminal device, and the terminal device may be in an RRC idle state or an RRC inactive state.

As shown in FIG. 9, in Step S910, if a time of positioning measurement overlaps with a time of paging detection, the terminal device performs the positioning measurement and/or the paging detection. Correspondingly, a base station may also process the conflict according to same logic. Specifically, if the time of the positioning measurement overlaps with the time of the paging detection, the base station may determine that the terminal device performs the positioning measurement and/or the paging detection.

When the time of the positioning measurement conflicts with the time of the paging detection, a behavior of the terminal device is clarified in this embodiment of the present application, thereby improving communication reliability.

The time of the paging detection may be a paging occasion (or a time corresponding to a paging occasion). In some embodiments, the time of the paging detection may be a time constituted by all paging occasions in one paging cycle. All the paging occasions in one paging cycle may be discontinuous in time domain. In some embodiments, "the time constituted by all paging occasions in one paging cycle" may include only a time corresponding to each of all the paging occasions in one paging cycle, and the time may be discontinuous. In some other embodiments, "the time constituted by all paging occasions in one paging cycle" may be a period of continuous time from the earliest paging occasion to the latest paging occasion in all the paging occasions.

In some embodiments, the time of the paging detection may be one of all the paging occasions in one paging cycle. In this case, Step S910 may be understood as: determining whether the time of the positioning measurement overlaps with each paging occasion; and if the time of the positioning measurement overlaps with a paging occasion, performing the positioning measurement and/or the paging detection on the paging occasion. That is, Step S910 is performed a plurality of times, to perform conflict determining on all the paging occasions in one paging cycle one by one to determine an operation that the terminal device needs to perform on each paging occasion.

In some embodiments, if the time of the positioning measurement overlaps with the time of the paging detection, the terminal device may perform the positioning measurement, and skip the paging detection.

In some embodiments, if the time of the positioning measurement overlaps with the time of the paging detection, the terminal device performs the paging detection, and skips the positioning measurement.

In some embodiments, if the time of the positioning measurement overlaps with the time of the paging detection, an operation that needs to be performed by the terminal device may be determined based on "whether being in an overlapping time of the time of the positioning measurement and the time of the paging detection". For example, the terminal device may perform the positioning measurement within the overlapping time, and perform the paging detection outside the overlapping time in one paging cycle. In one paging cycle, valid paging may be not in the overlapping time. Therefore, the paging detection may be performed outside the overlapping time and paging information may be detected. For another example, the terminal device may perform the paging detection within the overlapping time, and perform the positioning measurement outside the overlapping time in one paging cycle. When the terminal device performs positioning processing outside the overlapping time, because a measurement gap or a time window of the positioning processing is partially occupied by the paging detection, the positioning measurement is performed by using only part of the measurement gap or the time window during the positioning processing, and measurement accuracy is reduced. However, during the positioning processing, measurement results of a plurality of base stations need to be used to jointly calculate a position. Therefore, more measurement results are more conducive to identifying valid measurement (for example, measurement of a direct path). Rough positioning measurement is beneficial to the position calculation.

In some embodiments, that the terminal device performs the positioning measurement and/or the paging detection may be predefined by a protocol or indicated by using higher layer signalling. For example, that the terminal device performs the paging detection within the overlapping time may be predefined by a protocol or indicated by using higher layer signalling. For another example, that the terminal device performs the positioning measurement within the overlapping time may be predefined by a protocol or indicated by using higher layer signalling. For another example, performing the positioning measurement outside the overlapping time may be predefined by a protocol or indicated by using higher layer signalling. For another example, performing the paging detection outside the overlapping time may be predefined by a protocol or indicated by using higher layer signalling.

In some embodiments, if the time of the positioning measurement overlaps with the time of the paging detection, an operation that needs to be performed by the terminal device may be determined based on a priority of the positioning measurement and/or whether being in the overlapping time, and/or another factor.

In an example, if the priority of the positioning measurement meets a first condition, the terminal device performs the positioning measurement, and skips the paging detection. The first condition mentioned herein may be set depending on an actual situation. For example, the first condition may be that the priority of the positioning measurement is greater than or equal to a threshold. For another example, the first condition may be that the priority of the positioning measurement is greater than a priority of the paging detection. The priority of the paging detection may be defined by, for example, a priority of paging to be detected, and the priority of the paging may be defined based on, for example, a type of a paging service.

In another example, if the priority of the positioning measurement meets a first condition, the terminal device performs the positioning measurement within an overlapping time, and performs the paging detection outside the overlapping time.

In still another example, if the priority of the positioning measurement does not meet a first condition, the terminal device performs the paging detection, and skips the positioning measurement.

In yet another example, if the priority of the positioning measurement does not meet a first condition, the terminal device performs the paging detection within an overlapping time, and performs the positioning measurement outside the overlapping time. When the terminal device is in an RRC idle state or an RRC active state, except for the paging detection, the rest time may not be used for data transmission or reception, but may all be used for measurement or used as a measurement gap. Therefore, as long as a serving cell and a neighboring cell have a periodic PRS for transmission, the terminal device may adjust the time of the positioning measurement and move the positioning measurement to a time outside the overlapping time.

In some embodiments, that the terminal device performs the positioning measurement and/or the paging detection may be predefined by a protocol or indicated by the base station. For example, the protocol predefines that the terminal device performs the paging detection within the overlapping time and performs the positioning measurement outside the overlapping time. When the terminal device is in an RRC idle state or an RRC active state, except for the paging detection, the rest time may not be used for data transmission or reception, but may all be used for measurement or used as a measurement gap. Therefore, as long as a serving cell and a neighboring cell have a periodic PRS for transmission, the terminal device may adjust the time of the positioning measurement and move the positioning measurement to a time outside the overlapping time.

In some embodiments, before Step S910, the terminal device may first receive configuration information of the PEI and configuration information of the positioning measurement.

Embodiment 4

As mentioned above, in a current protocol, a DRX mode and uplink/downlink positioning are designed independently each other. In this way, a relationship between positioning measurement of a terminal device (including transmission of an SRS for the uplink positioning and measurement of a PRS for the downlink positioning) and a DRX active time and/or a sleep time is not clarified. Consequently, it is difficult to predict a behavior of the terminal device, thereby increasing an uncertainty of a communication process. For example, the DRX sleep time is designed for energy saving of the terminal device. However, if the terminal device needs to perform the positioning measurement within the DRX sleep time, the terminal device needs to wake up from the sleep state, thereby increasing power consumption. For another example, the terminal device may transmit a data channel within the DRX active time. However, if a base station configures a measurement gap (MG) within the DRX active time, the terminal device cannot transmit a data channel within the DRX active time (the current protocol specifies that when the terminal device is in the measurement gap, the terminal device usually does not transmit the data channel).

It can be seen that clarifying the relationship between the positioning measurement and the DRX sleep time and/or the DRX active time is a problem that needs to be resolved urgently. Embodiment 4 is intended to resolve the problem.

For ease of description, a concept of "a first time" is first introduced. The first time is a time within a first DRX cycle (the first DRX cycle may be any DRX cycle of the terminal device), and the first time may be used by the terminal device to perform the positioning measurement. The positioning measurement mentioned herein may include uplink positioning measurement and/or downlink positioning measurement. For the uplink positioning measurement, the first time may include a transmission time of an SRS. For example, the first time may include a transmission time of a periodic SRS, and/or a transmission time of a semi-persistent SRS. For the downlink positioning measurement, the first time may include a measurement time of a PRS. For example, the first time may include a measurement time of a periodic PRS, and/or a measurement time of a semi-persistent PRS. Therefore, in some embodiments, the first time may also be referred to as a positioning measurement time within the first DRX cycle.

In some embodiments, the first time is a continuous period of time within the first DRX cycle. For example, the first time may be one or more consecutive slots within the first DRX cycle. For another example, the first time may be one or more consecutive milliseconds within the first DRX cycle.

In some embodiments, the first time may be predefined by a protocol. For example, the protocol may define duration of the first time, a starting position and/or an ending position of the first time within the first DRX cycle, and/or the like.

In some embodiments, the first time may be configured by the base station. For example, the base station may configure the first time by using higher layer signalling. The higher layer signalling may be, for example, RRC signalling.

In some embodiments, the first time may be associated with one or more of the following information of the first DRX cycle: a DRX timer (which may include a DRX on duration timer and/or a DRX inactivity timer), and quality of service (QOS) information (for example, a quality of service class) of the positioning measurement by the terminal device.

In some embodiments, the first time may be a time corresponding to a DRX active state.

In an example, that the first time is a time corresponding to a DRX active state may include: the first time falls within the DRX active time. For example, the first time may be a time corresponding to the DRX on duration timer and/or a time corresponding to the DRX inactivity timer. Alternatively, the first time is part of a time corresponding to the DRX on duration timer and/or a time corresponding to the DRX inactivity timer. As shown in FIG. 10A, T1 represents the DRX active time, and T2 represents the DRX sleep time. The first time may be T1. That is, the terminal device does not perform the positioning measurement within the DRX sleep time. This may prevent the terminal device from waking up in a sleep process due to the positioning measurement, thereby reducing power consumption of the terminal device.

In another example, that the first time is a time corresponding to a DRX active state may include: a starting moment of the first time is determined based on a turn-on moment of the DRX on duration timer of the first DRX cycle. For example, the starting moment of the first time is the turn-on moment of the DRX on duration timer of the first DRX cycle. Alternatively, that the first time is a time corresponding to a DRX active state may include: a starting moment of the first time is determined based on a turn-on moment of the DRX on duration timer of the first DRX cycle and a first offset parameter. For example, the starting moment of the first time is a sum of the turn-on moment of the DRX on duration timer of the first DRX cycle and the first offset parameter. A value of the first offset parameter mentioned herein may be a positive number or a negative number. That is, the first offset parameter may be used to offset the turn-on moment of the DRX on duration timer forward, or may be used to offset the turn-on moment of the DRX on duration timer backward. The first offset parameter may be predefined by the protocol or configured by the base station. For example, the first offset parameter may be configured by the base station by using higher layer signalling (for example, RRC signalling). A setting of the first offset parameter may provide necessary flexibility for setting a timing measurement time. For example, the setting of the first offset parameter may ensure a radio frequency adjustment time of the terminal device.

In still another example (the example may be combined with the previous example), that the first time is a time corresponding to a DRX active state includes: an ending moment of the first time is determined based on a turn-off moment of a target timer (the DRX on duration timer or the DRX inactivity timer) of the first DRX cycle. For example, the ending moment of the first time is the turn-off moment of the target timer. Alternatively, that the first time is a time corresponding to a DRX active state may include: an ending moment of the first time is determined based on a target timer and a second offset parameter. For example, the ending moment of the first time is a sum of the turn-off moment of the target timer and the second offset parameter. A value of the second offset parameter mentioned herein may be a positive number or a negative number. That is, the second offset parameter may be used to offset the turn-off moment of the target timer forward, or may be used to offset the turn-off moment of the target timer backward. The second offset parameter may be predefined by the protocol or configured by the base station. For example, the second offset parameter may be configured by the base station by using higher layer signalling (for example, RRC signalling). The second offset parameter may be the same as or different from the first offset parameter mentioned in the previous example. A setting of the second offset parameter may ensure flexibility of a timing measurement time, for example, may ensure a radio frequency adjustment time. In addition, a starting time of the DRX sleep time is not fixed (the starting time changes with an incoming or outgoing packet), and the terminal device may not enter a deep sleep state within a period of time after the terminal device enters the DRX sleep time. Therefore, adding the second offset parameter may ensure flexibility of the positioning measurement. For example, assuming that the second offset parameter is used to offset the turn-off moment of the target timer backward, the setting of the second offset parameter may still make the terminal device perform the positioning measurement when the terminal device has not entered the deep sleep state after entering the DRX sleep time.

In some embodiments, the first time may be a time corresponding to a DRX sleep state.

Figure 10B:
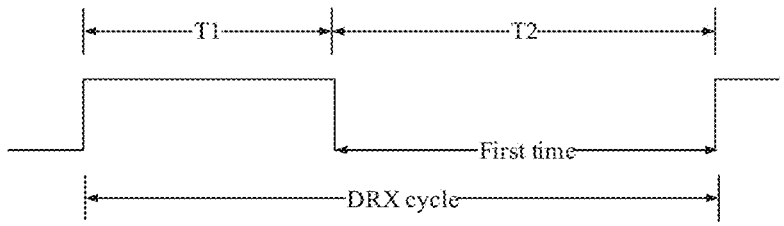
FIG. 10B is another example diagram of a relationship between a first time and a DRX cycle according to Embodiment 4.

In an example, that the first time is a time corresponding to a DRX sleep state may include: the first time falls within the DRX sleep time. For example, the first time may be all the time in the first DRX cycle except a time corresponding to the DRX on duration timer and/or a time corresponding to the DRX inactivity timer. For another example, the first time may be part of a time in the first DRX cycle except a time corresponding to the DRX on duration timer and/or a time corresponding to the DRX inactivity timer. As shown in FIG. 10B, T1 represents the DRX active time, and T2 represents the DRX sleep time. The first time may be T2. That is, the terminal device skips the positioning measurement within the DRX active time. When the terminal device performs the positioning measurement and after the terminal device enters the sleep time, the terminal device generally does not transmit or receive a data channel (for example, a PDSCH). Setting the first time within the DRX sleep time may allow the two time periods that are not used for data transmission or reception to overlap. In this way, the terminal device may fully transmit and receive the data channel within the DRX active time without being affected by the positioning measurement.

In another example, that the first time is a time corresponding to a DRX sleep state may include: a starting moment of the first time is determined based on a turn-off moment of a target timer (the DRX on duration timer or the DRX inactivity timer) of the first DRX cycle. For example, the starting moment of the first time is the turn-off moment of the target timer. For another example, that the first time is a time corresponding to a DRX sleep state may include: a starting moment of the first time is determined based on a turn-off moment of the target timer and a third offset parameter. For example, the starting moment of the first time is a sum of the turn-off moment of the target timer and the third offset parameter. A value of the third offset parameter mentioned herein may be a positive number or a negative number. That is, the third offset parameter may be used to offset the turn-off moment of the target timer forward, or may be used to offset the turn-off moment of the DRX on duration timer backward. The third offset parameter may be predefined by the protocol or configured by the base station. For example, the third offset parameter may be configured by the base station by using higher layer signalling (for example, RRC signalling). The third offset parameter may be the same as or different from the first offset parameter and/or the second offset parameter mentioned above. A setting of the third offset parameter may provide necessary flexibility for setting a timing measurement time. For example, the setting of the third offset parameter may ensure a radio frequency adjustment time of the terminal device.

In still another example (the example may be combined with the previous example), that the first time is a time corresponding to a DRX sleep state may include: an ending moment of the first time is determined based on a turn-on moment of a DRX on duration timer of a next DRX cycle (the next DRX cycle is a next DRX cycle of the first DRX cycle). For example, the ending moment of the first time is the turn-on moment of the DRX on duration timer of the next DRX cycle. Alternatively, that the first time is a time corresponding to a DRX sleep state may include: an ending moment of the first time is determined based on a turn-on moment of a DRX on duration timer of a next DRX cycle and/or a fourth offset parameter. For example, the ending moment of the first time is may be a sum of the turn-on moment of the DRX on duration timer of the next DRX cycle and the fourth offset parameter. A value of the fourth offset parameter mentioned herein may be a positive number or a negative number. That is, the fourth offset parameter may be used to offset the turn-on moment of the DRX on duration timer of the next DRX cycle forward, or may be used to offset the turn-on moment of the DRX on duration timer of the next DRX cycle backward. The fourth offset parameter may be predefined by the protocol or configured by the base station. For example, the fourth offset parameter may be configured by the base station by using higher layer signalling (for example, RRC signalling). The fourth offset parameter may be the same as or different from the first offset parameter, the second offset parameter, and the third offset parameter mentioned above. A setting of the fourth offset parameter may provide necessary flexibility for setting a timing measurement time. For example, the setting of the fourth offset parameter may ensure a radio frequency adjustment time of the terminal device.

In some embodiments, that the first time is a time corresponding to a DRX active state, or a time corresponding to a DRX sleep state may be determined based on quality of service information corresponding to the positioning measurement (or a positioning service). The quality of service information may be obtained from a positioning device. For example, the base station may receive a downlink positioning request transmitted by the positioning device, and the downlink positioning request may carry the quality of service information.

In an example, if a quality of service class indicated by the quality of service information is relatively high (for example, greater than or equal to a threshold), the first time may be configured as the time corresponding to the DRX active state. In another example, if the quality of service class indicated by the quality of service information is relatively low (for example, less than a threshold), the first time may be configured as the time corresponding to the DRX sleep state. In still another example, after receiving the quality of service information corresponding to the positioning measurement from the positioning device, the base station may determine, based on the quality of service information, whether the first time needs to include the DRX active time. That the first time includes the DRX active time may be that the first time includes a timing time (for example, part of the timing time) of the DRX on duration timer and/or the DRX inactivity timer. In an example, the base station may determine, based on the quality of service information and an energy saving requirement of the terminal device, whether the first time needs to include the DRX active time. For example, if a positioning measurement service of the terminal device has a higher priority, the base station determines that the first time needs to include the DRX active time. If the first time needs to include the DRX active time, in some embodiments, the base station may configure the first time, so that the first time includes the DRX active time. In some embodiments, the base station may notify the terminal device whether the first time needs to include the DRX active time.

Figure 11A:
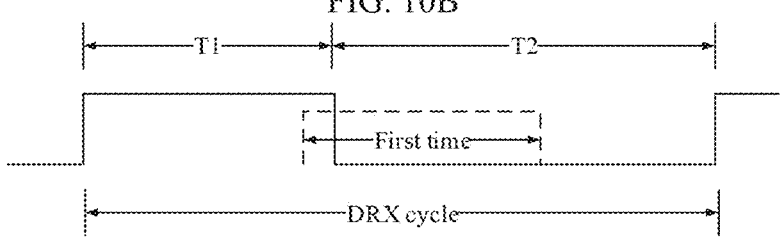
FIG. 11A is still another example diagram of a relationship between a first time and a DRX cycle according to Embodiment 4.
Figure 11B:
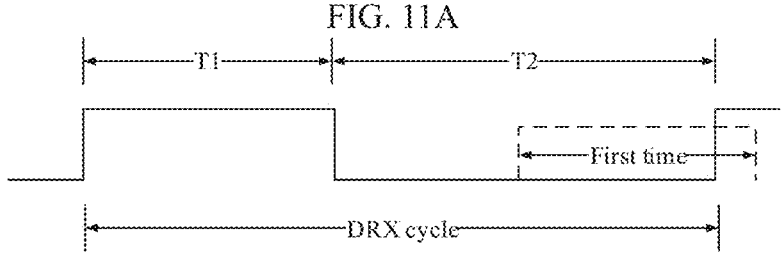
FIG. 11B is yet another example diagram of a relationship between a first time and a DRX cycle according to Embodiment 4.

That the first time includes the DRX active time may be that part of the first time overlaps with the DRX active time. FIG. 11A and FIG. 11B show two examples in which the first time includes the DRX active time. In the example in FIG. 11A, the first time includes a short period of time within which an ending moment of the DRX active time is located. Within the first time shown in FIG. 11A, the terminal device is in an active state or in a light sleep state, and does not enter a deep sleep state. Performing the positioning measurement by using the period of time may reduce power consumption. In the example in FIG. 11B, the first time includes a short period of time within which a starting moment of the DRX active time is located. Within the first time shown in FIG. 11B, the terminal device is in a light sleep state in which the terminal device is about to wake up or in an active state, and does not enter a deep sleep state. Performing the positioning measurement by using the period of time may reduce power consumption.

Figure 12:
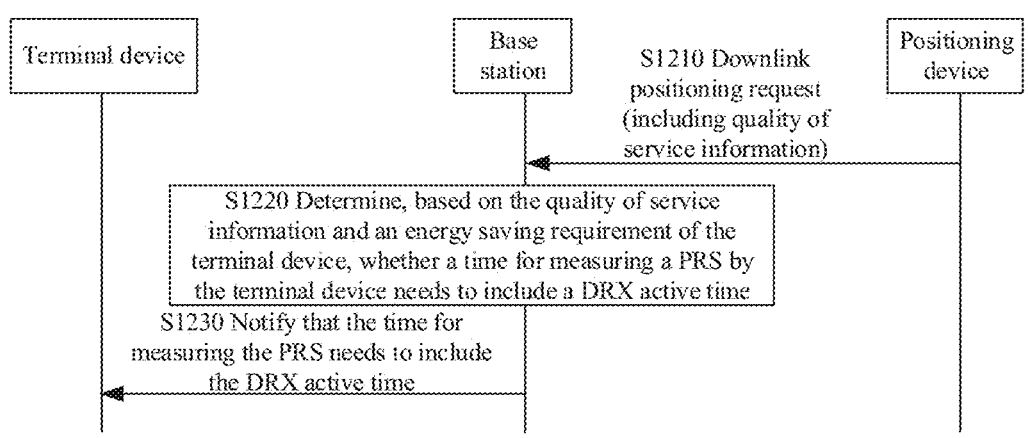
FIG. 12 is a schematic flowchart of a wireless communication method according to Embodiment 4.

For ease of understanding, Embodiment 4 is described in more detail below with reference to FIG. 12. In the example in FIG. 12, the first time is a measurement time of a PRS, for example, a measurement gap of the PRS.

In Step S1210, a base station receives a downlink positioning request for a terminal device transmitted by a positioning device. The downlink positioning request may include quality of service information corresponding to downlink positioning.

In Step S1220, the base station determines, based on the quality of service information and an energy saving requirement of the terminal device, whether a time for measuring the PRS by the terminal device needs to include a DRX active time.

In Step S1230, the base station notifies the terminal device that the time for measuring the PRS needs to include the DRX active time.

A possible implementation of Embodiment 4 is provided above, but an implementation of Embodiment 4 is not limited thereto. Another possible implementation of Embodiment 4 is provided below.

If a terminal device is in a DRX active time, the terminal device may monitor a PDCCH, to transmit and receive a data channel. If the terminal device is in a DRX sleep time, the terminal device usually does not transmit or receive the data channel. Because neither of a measurement gap (the terminal device does not transmit or receive the data channel in the measurement gap) and the DRX sleep time is usually used to transmit or receive the data channel, a possible design solution for downlink positioning is to configure the measurement gap in the DRX sleep time. In this way, the measurement gap does not occupy the DRX active time, so that the DRX active time can be fully used for transmitting the data channel. In an example, a base station may configure the measurement gap in the DRX sleep time. Then the base station may notify a positioning device of a time corresponding to the measurement gap. After obtaining the time corresponding to the measurement gap, the positioning device may configure a transmission time of a PRS in the measurement gap. In this way, the positioning device may not learn configuration information of DRX (for example, a time corresponding to the DRX active time).

However, in a current protocol, a DRX cycle and a cycle of the measurement gap are not matched.

Possible configurations of a short DRX cycle provided in the current protocol (for example, TS 38.331) are provided below:

--- shortDRX                  SEQUENCE {
  drx-ShortCycle           ENUMERATED {
                              ms2, ms3, ms4, ms5, ms6, ms7,
ms8, ms10, ms14, ms16, ms20, ms30, ms32, ms35, ms40, ms64, ms80,
ms128, ms160, ms256, ms320, ms512, ms640, spare9, spare8, spare7,
spare6, spare5, spare4, spare3, spare2, spare1},
....}

---

However, the current protocol (for example, TS 38.133) specifies that the cycle of the measurement gap may be configured as one of the following cycles: 20 ms, 40 ms, 80 ms, and 160 ms.

According to the above content, it can be seen that the cycle of the measurement gap and the DRX cycle are not matched, and it is not ensured that the measurement gap definitely falls within the DRX sleep time. Therefore, if it is hoped that the measurement gap falls within the DRX sleep time, a major change may be made to the current protocol.

Embodiment 5

In a current positioning system, if signalling interaction between a terminal device and a positioning device is not completed within one DRX cycle, a relatively long interaction time of positioning information is caused, thereby increasing a positioning delay. This is because the terminal device and the positioning device usually exchange the positioning information by using LPP signalling, but the LPP signalling is transparently transmitted for a base station. That is, the base station learns neither when the terminal device performs positioning measurement, nor a delay requirement of positioning measurement. Therefore, the base station does not change DRX configuration information of the terminal device due to a related requirement of the positioning measurement. It can be seen that if the signalling interaction between the terminal device and the positioning device fails to be completed within one DRX cycle, the base station cannot learn this case. Because the base station cannot learn this case, the base station directly ends a DRX active time without extending the DRX active time by triggering a DRX inactivity timer. In this way, the LPP signalling interaction between the terminal device and the positioning device cannot be continued until a next DRX cycle, thereby increasing a positioning delay. Embodiment 5 is intended to provide a solution for reducing a positioning delay, to reduce the positioning delay occurred when the terminal device works in a DRX mode. Embodiment 5 is described below in detail with examples with reference to FIG. 13.

Figure 13:
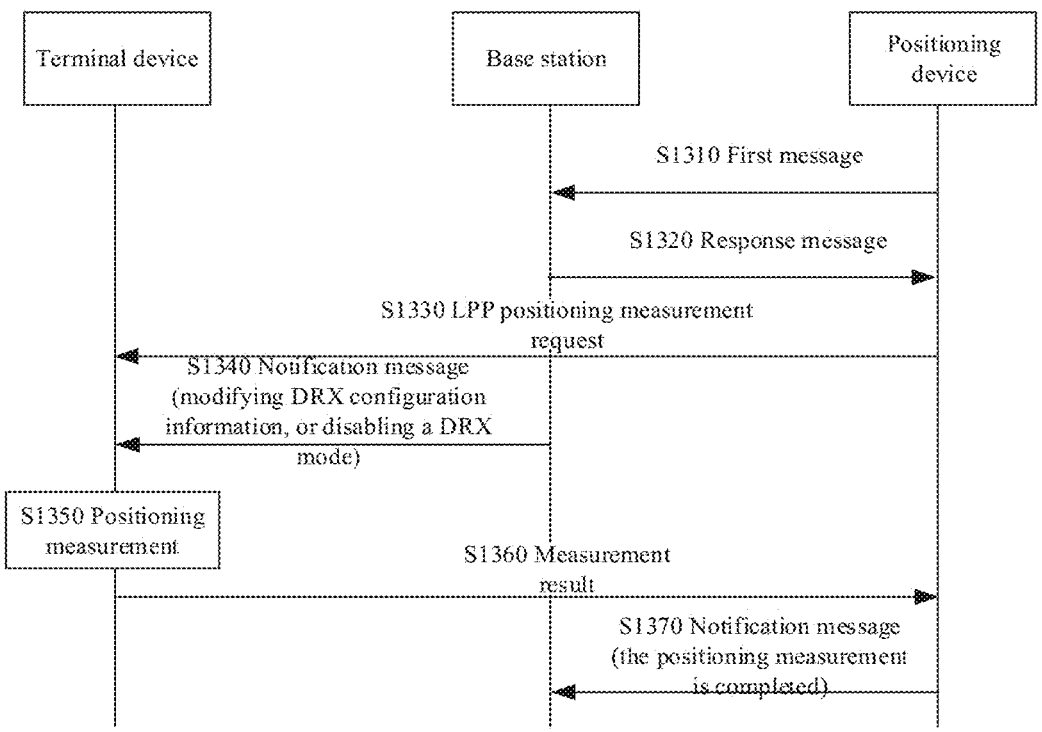
FIG. 13 is a schematic flowchart of a wireless communication method according to Embodiment 5.

FIG. 13 is a schematic flowchart of a wireless communication method according to Embodiment 5. The method in FIG. 13 is described from a perspective of interaction between a terminal device, a positioning device, and a base station. For related descriptions of the terminal device, the base station, and the positioning device, reference may be made to the foregoing descriptions. An NR system is used as an example, the base station may be a gNB, and the positioning device may be an LMF.

As shown in FIG. 13, in Step S1310, the base station receives a first message transmitted by the positioning device. The first message may be, for example, a positioning processing request. The first message may include first information. The first information may be referred to as positioning measurement information of the terminal device. The first information may be used to indicate or include time information (or an LPP signalling interaction time) of positioning measurement by the terminal device. The time information of the positioning measurement may include, for example, a starting time for performing the positioning measurement by the terminal device, and certainly, may further include duration and/or an ending time of the positioning measurement. That is, the positioning device may notify the base station of the time information of the positioning measurement in advance. After receiving the first information, the base station may determine whether to adjust a DRX mode of the terminal device. For example, the base station may determine to perform or not perform one or more of the following operations: disabling the DRX mode of the terminal device; extending a DRX active time; or adjusting configuration information of a long DRX cycle and configuration information of a short DRX cycle of DRX. In an example, the base station may trigger or reset a DRX inactivity timer by using scheduling data, to extend the DRX active time. Alternatively, the base station may properly extend a DRX active time by using long and short DRX cycles, so that the interaction of the positioning information (for example, the LPP signalling interaction) can be completed relatively quickly.

In some embodiments, the first information may further include one or more of the following information: identity information of the terminal device (identity information of a terminal device about to start positioning measurement), quality of service information of the positioning measurement, or a delay requirement of the positioning measurement.

In some embodiments, the first message may include second information. The second information may be used to instruct the base station to disable a DRX mode of the terminal device, or instruct the base station to adjust configuration information of DRX of the terminal device (or instruct the base station to extend a DRX active time). The configuration information of the DRX includes one or more of the following information: configuration information of a long DRX cycle, configuration information of a short DRX cycle, or a value of a timer of the DRX. For example, the positioning device may suggest a value of the timer of the DRX (for example, a DRX inactivity timer) to the base station. For another example, the positioning device may suggest that the base station disables the DRX mode. For another example, the positioning device may suggest, to the base station, the configuration information of the long DRX cycle and the configuration information of the short DRX cycle of the terminal device.

After receiving the first message, the base station may determine to perform or not to perform a first operation. The first operation may include one of the following operations: disabling the DRX mode of the terminal device; triggering an inactivity timer of the terminal device; or adjusting the configuration information of the long DRX cycle and the configuration information of the short DRX cycle of the DRX. For example, the positioning device may suggest that the base station disables the DRX mode of the terminal device.

In some embodiments, as shown in FIG. 13, in Step S1320, after receiving the first message, the base station may transmit a response message of the first message to the positioning device. The response message may be, for example, a positioning processing response to the positioning processing request. The response message may be used to indicate, to the positioning device, a result of processing the first message by the base station. For example, the response message may be used to notify the positioning device that the base station disables the DRX mode of the terminal device or does not disable the DRX mode of the terminal device.

In some embodiments, the method in FIG. 13 may further include one or more of the steps among Step S1330 to Step S1370. The steps are all optional. The steps are described in detail below.

In Step S1330, the positioning device may transmit an LPP positioning measurement request to the terminal device. The LPP positioning measurement request is transparently transmitted for the base station.

In Step S1340, the base station may transmit a notification message to the terminal device. The notification message may be used to, for example, notify the terminal device to modify DRX configuration information, or the notification message may be used to notify the terminal device to disable the DRX mode. In this embodiment of the present application, an execution order of Step S1330 and Step S1340 is not specifically limited, and Step S1330 and Step S1340 may be executed simultaneously or one after another. For example, Step S1330 may be executed first, and then Step S1340 may be executed; or Step S1340 may be executed first, and then Step S1330 may be executed.

In Step S1350, the terminal device performs positioning measurement. For example, the terminal device may measure a PRS transmitted by the positioning device.

In Step S1360, the terminal device transmits a measurement result of the positioning measurement to the positioning device by using the base station.

In Step S1370, the positioning device may send a notification message to the base station, to notify the base station that the positioning measurement is completed. For example, if the base station disables the DRX mode of the terminal device due to the positioning measurement, the base station may enable the DRX mode of the terminal device again after learning the notification message.

The method embodiments of the present application are described above in detail with reference to FIG. 1 to FIG. 13. Apparatus embodiments of the present application are described below in detail with reference to FIG. 14 to FIG. 23. It should be understood that the descriptions of the method embodiments correspond to descriptions of the apparatus embodiments, and therefore, for parts that are not described in detail, reference may be made to the foregoing method embodiments.

Figure 14:
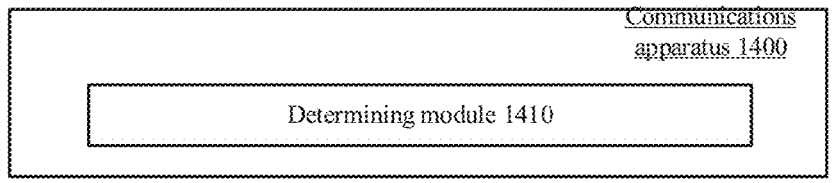
FIG. 14 is a schematic diagram of a structure of a communications apparatus according to an embodiment of the present application.

FIG. 14 is a schematic diagram of a structure of a communications apparatus according to an embodiment of the present application. A communications apparatus 1400 in FIG. 14 is a positioning device in a core network. The communications apparatus 1400 may include a determining module 1410. The determining module 1410 may be configured to determine a first time period, where a time domain position of the first time period is associated with a time domain position of a second time period; and the first time period is used by a terminal device to perform positioning measurement or SRS transmission, and the second time period is used by the terminal device to perform paging detection.

Optionally, that a time domain position of the first time period is associated with a time domain position of a second time period includes: the first time period partially or completely overlaps with the second time period; or the first time period is located adjacent to the second time period.

Optionally, that the first time period is located adjacent to the second time period includes: the first time period and the second time period form a continuous time period; or a time interval between the first time period and the second time period is less than or equal to a first threshold.

Optionally, the time interval between the first time period and the second time period is one of the following time intervals: a time interval between a starting time of the first time period and a starting time of the second time period; a time interval between the starting time of the first time period and an ending time of the second time period; a time interval between an ending time of the first time period and the starting time of the second time period; and a time interval between the ending time of the first time period and the ending time of the second time period.

Optionally, the first threshold is predefined by a protocol; or the first threshold is determined based on a time that the terminal device enters an out-of-synchronization status from a synchronization status.

Optionally, the first threshold is less than or equal to: $\alpha T/N + \sigma$, where T is a paging cycle, and N is a quantity of paging frames in one paging cycle; $\alpha=1$ or $\alpha$ is predefined by a protocol or $\alpha$ is a predefined higher layer parameter; and $\sigma=0$ or $\sigma$ is predefined by a protocol or $\sigma$ is a predefined higher layer parameter.

Optionally, the time that the terminal device enters an out-of-synchronization status from a synchronization status is transmitted by the terminal device to the positioning device by using LPP signalling.

Optionally, the first time period is determined based on first information, and the first information includes one or more of the following information: second information, associated with the paging detection; and/or third information, indicating a time period capable of being used for positioning measurement or SRS transmission.

Optionally, the second information includes one or more of the following information: a paging cycle; a DRX cycle of the terminal device; a frame offset of a paging frame; a quantity of paging frames included in the paging cycle; an identity of the terminal device; a position of the paging frame; a time that the terminal device enters an out-of-synchronization status from a synchronization status; and a position of a paging occasion.

Optionally, the second information is transmitted by a target device to the positioning device, where the target device is a base station corresponding to a serving cell, the terminal device, or a device in the core network.

Optionally, the third information includes a starting point and/or a length of the time period capable of being used for positioning measurement or SRS transmission.

Optionally, the terminal device is in an RRC idle state or an RRC inactive state.

Figure 15:
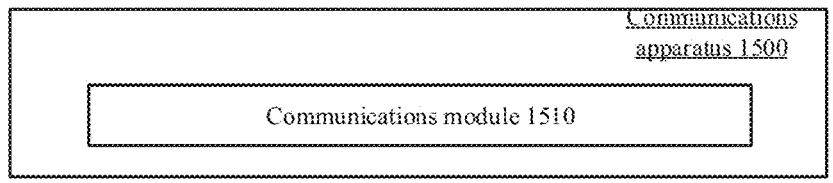
FIG. 15 is a schematic diagram of a structure of a communications apparatus according to another embodiment of the present application.

FIG. 15 is a schematic diagram of a structure of a communications apparatus according to another embodiment of the present application. A communications apparatus 1500 in FIG. 15 is a terminal device or a base station. The communications apparatus 1500 includes a communications module 1510.

The communications module 1510 may be configured to transmit first information to a positioning device in a core network, where the first information is used to determine a first time period, and a time domain position of the first time period is associated with a time domain position of a second time period; and the first time period is used by the terminal device to perform positioning measurement or SRS transmission, and the second time period is used by the terminal device to perform paging detection.

Optionally, that a time domain position of the first time period is associated with a time domain position of a second time period includes: the first time period partially or completely overlaps with the second time period; or the first time period is located adjacent to the second time period.

Optionally, that the first time period is located adjacent to the second time period includes: the first time period and the second time period form a continuous time period; or a time interval between the first time period and the second time period is less than or equal to a first threshold.

Optionally, the time interval between the first time period and the second time period is one of the following time intervals: a time interval between a starting time of the first time period and a starting time of the second time period; a time interval between the starting time of the first time period and an ending time of the second time period; a time interval between an ending time of the first time period and the starting time of the second time period; and a time interval between the ending time of the first time period and the ending time of the second time period.

Optionally, the first threshold is predefined by a protocol; or the first threshold is determined based on a time that the terminal device enters an out-of-synchronization status from a synchronization status.

Optionally, the first threshold is less than or equal to: $\alpha T/N + \sigma$, where T is a paging cycle, and N is a quantity of paging frames in one paging cycle; $\alpha=1$ or $\alpha$ is predefined by a protocol or $\alpha$ is a predefined higher layer parameter; and $\sigma=0$ or $\sigma$ is predefined by a protocol or $\sigma$ is a predefined higher layer parameter.

Optionally, the time that the terminal device enters an out-of-synchronization status from a synchronization status is transmitted by the terminal device to the positioning device by using LPP signalling.

Optionally, the first information includes one or more of the following information: second information, associated with the paging detection; and/or third information, indicating a time period capable of being used for positioning measurement or SRS transmission.

Optionally, the second information includes one or more of the following information: a paging cycle; a DRX cycle of the terminal device; a frame offset of a paging frame; a quantity of paging frames included in the paging cycle; an identity of the terminal device; a position of the paging frame; a time that the terminal device enters an out-ofsynchronization status from a synchronization status; and a position of a paging occasion.

Optionally, the third information includes a starting point and/or a length of the time period capable of being used for positioning measurement or SRS transmission.

Optionally, the terminal device is in an RRC idle state or an RRC inactive state.

Figure 16:
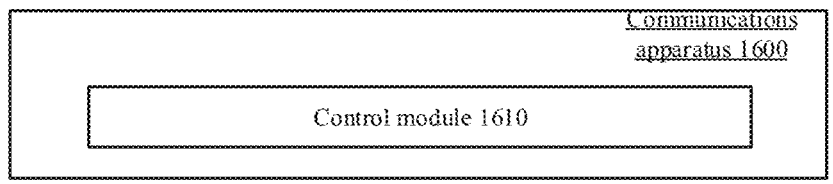
FIG. 16 is a schematic diagram of a structure of a communications apparatus according to still another embodiment of the present application.

FIG. 16 is a schematic diagram of a structure of a communications apparatus according to still another embodiment of the present application. A communications apparatus 1600 in FIG. 16 is a terminal device. The communications apparatus 1600 includes a control module 1610.

The control module 1610 may be configured to: if a time of positioning measurement overlaps with a detection time of a PEI, control the terminal device to perform the positioning measurement and/or to detect the PEI.

Optionally, that the terminal device performs the positioning measurement and/or detects the PEI is determined based on a priority of the positioning measurement.

Optionally, that the terminal device performs the positioning measurement and/or detects the PEI being determined based on a priority of the positioning measurement includes: if the priority of the positioning measurement meets a first condition, performing, by the terminal device, the positioning measurement, and skipping detecting of the PEI; or if the priority of the positioning measurement does not meet a first condition, detecting, by the terminal device, the PEI, and skipping the positioning measurement.

Optionally, the control module is further configured to: if the terminal device performs the positioning measurement, and skips detecting of the PEI, control the terminal device to perform paging detection in a paging cycle indicated by the PEI.

Optionally, a following behavior of the terminal device is predefined by a protocol: performing, by the terminal device, the positioning measurement, and skipping detecting of the PEI; and/or if the terminal device performs the positioning measurement, and skips detecting of the PEI, performing, by the terminal device, the paging detection in the paging cycle indicated by the PEI.

Optionally, the detection time of the PEI is: a time constituted by all detection occasions of the PEI; or one detection occasion of the PEI.

Optionally, the terminal device is in an RRC idle state or an RRC inactive state.

Figure 17:
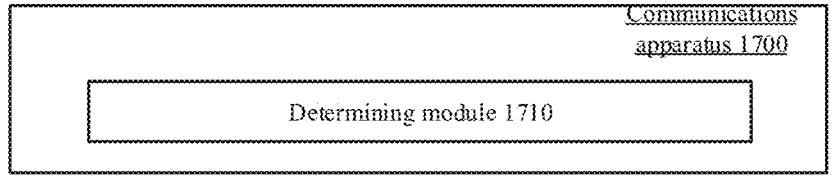
FIG. 17 is a schematic diagram of a structure of a communications apparatus according to yet another embodiment of the present application.

FIG. 17 is a schematic diagram of a structure of a communications apparatus according to yet another embodiment of the present application. A communications apparatus 1700 in FIG. 17 is a base station. The communications apparatus 1700 includes a determining module 1710.

The determining module 1710 may be configured to: if a time of positioning measurement overlaps with a detection time of a PEI, determine that a terminal device performs the positioning measurement and/or detects the PEI.

Optionally, that a terminal device performs the positioning measurement and/or detects the PEI is determined based on a priority of the positioning measurement.

Optionally, that a terminal device performs the positioning measurement and/or detects the PEI being determined based on a priority of the positioning measurement includes: if the priority of the positioning measurement meets a first condition, performing, by the terminal device, the positioning measurement, and skipping detecting of the PEI; or if the priority of the positioning measurement does not meet a first condition, detecting, by the terminal device, the PEI, and skipping the positioning measurement.

Optionally, the determining module is further configured to: if the terminal device performs the positioning measurement, and skips detecting of the PEI, determine that the terminal device performs paging detection in a paging cycle indicated by the PEI.

Optionally, a following behavior of the terminal device is predefined by a protocol: performing, by the terminal device, the positioning measurement, and skipping detecting of the PEI; and/or if the terminal device performs the positioning measurement, and skips detecting of the PEI, performing, by the terminal device, the paging detection in the paging cycle indicated by the PEI.

Optionally, the detection time of the PEI is: a time constituted by all detection occasions of the PEI; or one detection occasion of the PEI.

Optionally, the terminal device is in an RRC idle state or an RRC inactive state.

Figure 18:
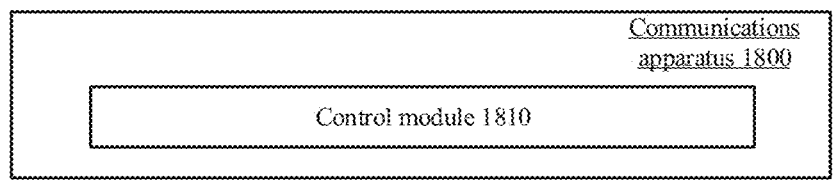
FIG. 18 is a schematic diagram of a structure of a communications apparatus according to still yet another embodiment of the present application.

FIG. 18 is a schematic diagram of a structure of a communications apparatus according to still yet another embodiment of the present application. A communications apparatus 1800 in FIG. 18 is a terminal device. The communications apparatus 1800 includes a control module 1810.

The control module 1810 may be configured to: if a time of positioning measurement overlaps with a time of paging detection, control the terminal device to perform the positioning measurement and/or the paging detection.

Optionally, that the terminal device performs the positioning measurement and/or the paging detection is determined based on a priority of the positioning measurement; or that the terminal device performs the positioning measurement and/or the paging detection is predefined by a protocol or indicated by using higher layer signalling.

Optionally, that the terminal device performs the positioning measurement and/or the paging detection includes: if the priority of the positioning measurement meets a first condition, performing, by the terminal device, the positioning measurement, and skipping the paging detection; or if the priority of the positioning measurement meets a first condition, performing, by the terminal device, the positioning measurement within an overlapping time, and performing the paging detection outside the overlapping time; or if the priority of the positioning measurement does not meet a first condition, performing, by the terminal device, the paging detection, and skipping the positioning measurement; or if the priority of the positioning measurement does not meet a first condition, performing, by the terminal device, the paging detection within an overlapping time, and performing the positioning measurement outside the overlapping time.

Optionally, a following behavior of the terminal device is predefined by a protocol or indicated by using higher layer signalling: performing, by the terminal device, the paging detection within an overlapping time; or performing, by the terminal device, the positioning measurement within an overlapping time.

Optionally, a following behavior of the terminal device is predefined by a protocol or indicated by using higher layer signalling: performing, by the terminal device, the positioning measurement outside an overlapping time; or performing, by the terminal device, the paging detection outside an overlapping time.

Optionally, the time of the paging detection is one of the following: a time constituted by all paging occasions in one paging cycle; or one paging occasion.

Optionally, the terminal device is in an RRC idle state or an RRC inactive state.

Figure 19:
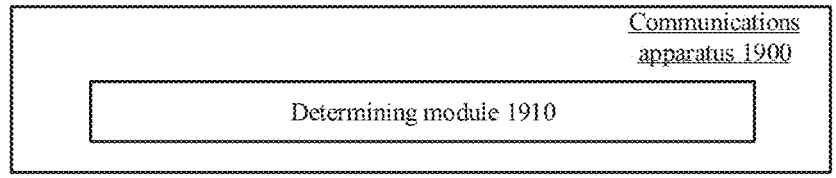
FIG. 19 is a schematic diagram of a structure of a communications apparatus according to a further embodiment of the present application.

FIG. 19 is a schematic diagram of a structure of a communications apparatus according to a further embodiment of the present application. A communications apparatus 1900 in FIG. 19 is a base station. The communications apparatus 1900 in FIG. 7 includes a determining module 1910.

The determining module 1910 may be configured to: if a time of positioning measurement overlaps with a time of paging detection, determine that a terminal device performs the positioning measurement and/or the paging detection.

Optionally, that a terminal device performs the positioning measurement and/or the paging detection is determined based on a priority of the positioning measurement; or that a terminal device performs the positioning measurement and/or the paging detection is predefined by a protocol or indicated by using higher layer signalling.

Optionally, that a terminal device performs the positioning measurement and/or the paging detection includes: if the priority of the positioning measurement meets a first condition, performing, by the terminal device, the positioning measurement, and skipping the paging detection; or if the priority of the positioning measurement meets a first condition, performing, by the terminal device, the positioning measurement within an overlapping time, and performing the paging detection outside the overlapping time; or if the priority of the positioning measurement does not meet a first condition, performing, by the terminal device, the paging detection, and skipping the positioning measurement; or if the priority of the positioning measurement does not meet a first condition, performing, by the terminal device, the paging detection within an overlapping time, and performing the positioning measurement outside the overlapping time.

Optionally, a following behavior of the terminal device is predefined by a protocol or indicated by using higher layer signalling: performing, by the terminal device, the paging detection within an overlapping time; or performing, by the terminal device, the positioning measurement within an overlapping time.

Optionally, a following behavior of the terminal device is predefined by a protocol or indicated by using higher layer signalling: performing, by the terminal device, the positioning measurement outside an overlapping time; or performing, by the terminal device, the paging detection outside an overlapping time.

Optionally, the time of the paging detection is one of the following: a time constituted by all paging occasions in one paging cycle; or one paging occasion.

Optionally, the terminal device is in an RRC idle state or an RRC inactive state.

Figure 20:
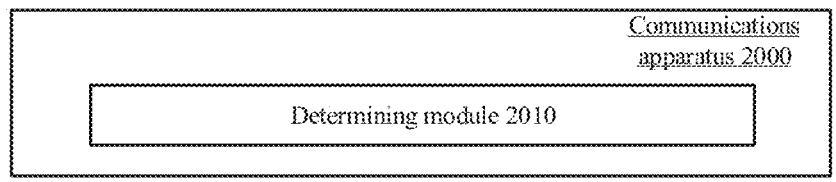
FIG. 20 is a schematic diagram of a structure of a communications apparatus according to a still further embodiment of the present application.

FIG. 20 is a schematic diagram of a structure of a communications apparatus according to a still further embodiment of the present application. A communications apparatus 2000 in FIG. 20 includes a determining module 2010. The determining module 2010 may be configured to determine a first time within a first DRX cycle, where the first time is predefined by a protocol or configured by a base station, and the first time is a time for positioning measurement performed by a terminal device.

Optionally, the first time is a time corresponding to a DRX active state; or the first time is a time corresponding to a DRX sleep state.

Optionally, that the first time is a time corresponding to a DRX active state includes: the first time falls within a DRX active time.

Optionally, that the first time is a time corresponding to a DRX active state includes: a starting moment of the first time is determined based on a turn-on moment of a DRX on duration timer of the first DRX cycle and/or a first offset parameter, where a value of the first offset parameter is a positive number or a negative number.

Optionally, the starting moment of the first time is the turn-on moment of the DRX on duration timer; or the starting moment of the first time is a sum of the turn-on moment of the DRX on duration timer and the first offset parameter.

Optionally, that the first time is a time corresponding to a DRX active state includes: an ending moment of the first time is determined based on a turn-off moment of a target timer of the first DRX cycle and/or a second offset parameter, where the target timer is a DRX on duration timer or a DRX inactivity timer, and a value of the second offset parameter is a positive number or a negative number.

Optionally, the ending moment of the first time is the turn-off moment of the target timer; or the ending moment of the first time is a sum of the turn-off moment of the target timer and the second offset parameter.

Optionally, that the first time is a time corresponding to a DRX sleep state includes: the first time falls within a DRX sleep time.

Optionally, that the first time is a time corresponding to a DRX sleep state includes: a starting moment of the first time is determined based on a turn-off moment of a target timer of the first DRX cycle and/or a third offset parameter, where the target timer is a DRX on duration timer or a DRX inactivity timer, and a value of the third offset parameter is a positive number or a negative number.

Optionally, the starting moment of the first time is the turn-off moment of the target timer; or the starting moment of the first time is a sum of the turn-off moment of the target timer and the third offset parameter.

Optionally, that the first time is a time corresponding to a DRX sleep state includes: an ending moment of the first time is determined based on a turn-on moment of a DRX on duration timer of a next DRX cycle of the first DRX cycle and/or a fourth offset parameter, where a value of the fourth offset parameter is a positive number or a negative number.

Optionally, the ending moment of the first time is the turn-on moment of the DRX on duration timer of the next DRX cycle; or the ending moment of the first time is a sum of the turn-on moment of the DRX on duration timer of the next DRX cycle and the fourth offset parameter.

Optionally, that the first time is a time corresponding to a DRX active state, or a time corresponding to a DRX sleep state is determined based on quality of service information of the positioning measurement.

Optionally, the first time includes one or more of the following: a transmission time of a periodic SRS; a transmission time of a semi-persistent SRS; a measurement time of a periodic PRS; or a measurement time of a semi-persistent PRS.

Figure 21:
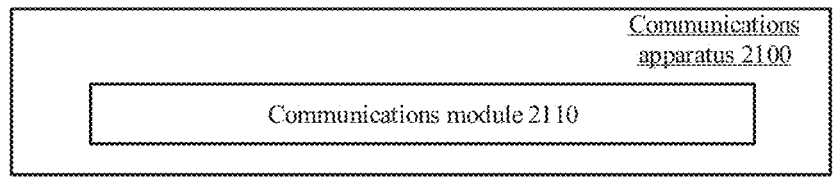
FIG. 21 is a schematic diagram of a structure of a communications apparatus according to a yet further embodiment of the present application.

FIG. 21 is a schematic diagram of a structure of a communications apparatus according to a yet further embodiment of the present application. A communications apparatus 2100 in FIG. 21 is a base station. The communications apparatus 2100 includes a communications module 2110.

The communications module 2110 may be configured to receive a first message transmitted by a positioning device in a core network, where the first message includes one or more of the following information: first information, including time information of positioning measurement by a terminal device; and second information, used to instruct the base station to disable a DRX mode of the terminal device, or instruct the base station to adjust configuration information of DRX of the terminal device.

Optionally, the first information further includes one or more of the following information: identity information of the terminal device, quality of service information of the positioning measurement, or a delay requirement of the positioning measurement.

Optionally, the configuration information of the DRX includes one or more of the following information: configuration information of a long DRX cycle, configuration information of a short DRX cycle, or a value of a timer of the DRX.

Optionally, the communications apparatus further includes: an execution module, configured to perform one of the following operations based on the first message: disabling the DRX mode of the terminal device; triggering an inactivity timer of the terminal device; or adjusting configuration information of a long DRX cycle and configuration information of a short DRX cycle of the DRX.

Figure 22:
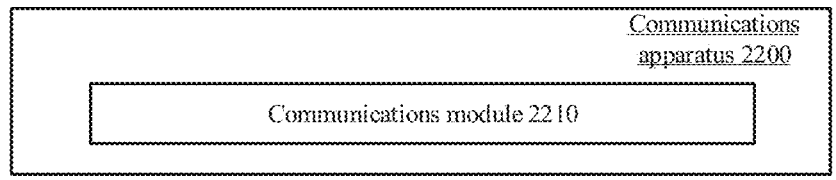
FIG. 22 is a schematic diagram of a structure of a communications apparatus according to a still yet further embodiment of the present application.

FIG. 22 is a schematic diagram of a structure of a communications apparatus according to a still yet further embodiment of the present application. A communications apparatus 2200 in FIG. 22 is a positioning device in a core network. The communications apparatus 2200 includes a communications module 2210.

The communications module 2210 may be configured to transmit a first message to a base station, where the first message includes one or more of the following information: first information, including time information of positioning measurement by a terminal device; and second information, used to instruct the base station to disable a DRX mode of the terminal device, or instruct the base station to adjust configuration information of DRX of the terminal device.

Optionally, the first information further includes one or more of the following information: identity information of the terminal device, quality of service information of the positioning measurement, or a delay requirement of the positioning measurement.

Optionally, the configuration information of the DRX includes one or more of the following information: configuration information of a long DRX cycle, configuration information of a short DRX cycle, or a value of a timer of the DRX.

Figure 23:
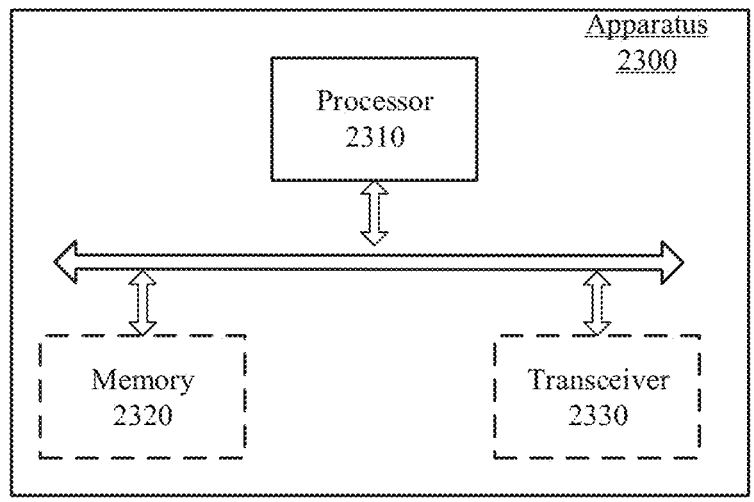
FIG. 23 is a schematic diagram of a structure of an apparatus according to an embodiment of the present application.

FIG. 23 is a schematic diagram of a structure of an apparatus according to an embodiment of the present application. Dashed lines in FIG. 23 indicate that a unit or module is optional. The apparatus 2300 may be configured to implement the methods described in the foregoing method embodiments. The apparatus 2300 may be a chip, a terminal device, a base station, or a positioning device.

The apparatus 2300 may include one or more processors 2310. The processor 2310 may allow the apparatus 2300 to implement the methods described in the foregoing method embodiments. The processor 2310 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 2300 may further include one or more memories 2320. The memory 2320 stores a program that may be executed by the processor 2310, so that the processor 2310 performs the methods described in the foregoing method embodiments. The memory 2320 may be independent of the processor 2310 or may be integrated into the processor 2310.

The apparatus 2300 may further include a transceiver 2330. The processor 2310 may communicate with another device or chip by using the transceiver 2330. For example, the processor 2310 may transmit and receive data to and from another device or chip by using the transceiver 2330.

An embodiment of the present application further provides a computer-readable storage medium for storing a program. The computer-readable storage medium may be applied to the terminal, the base station, or the positioning device provided in embodiments of the present application, and the program causes a computer to perform a method to be performed by the terminal, the base station, or the positioning device in each embodiment of the present application.

An embodiment of the present application further provides a computer program product. The computer program product includes a program. The computer program product may be applied to the terminal, the base station, or the positioning device provided in embodiments of the present application, and the program causes a computer to perform a method to be performed by the terminal, the base station, or the positioning device in each embodiment of the present application.

An embodiment of the present application further provides a computer program. The computer program may be applied to the terminal, the base station, or the positioning device provided in embodiments of the present application, and the program causes a computer to perform a method to be performed by the terminal, the base station, or the positioning device in each embodiment of the present application.

It should be understood that, in embodiments of the present application, "B that is corresponding to A" means that B is associated with A, and B may be determined based on A. However, it should further be understood that, determining B based on A does not mean determining B based only on A, but instead B may be determined based on A and/or other information.

It should be understood that, in this specification, the term "and/or" is merely an association relationship that describes associated objects, and represents that there may be three relationships. For example, A and/or B may represent three cases: only A exists, both A and B exist, and only B exists. In addition, the character "/" herein generally indicates an "or" relationship between the associated objects.

It should be understood that, in embodiments of the present application, sequence numbers of the foregoing processes do not mean execution sequences. The execution sequences of the processes should be determined according to functions and internal logic of the processes, and should not be construed as any limitation on the implementation processes of embodiments of the present application.

In several embodiments provided in the present application, it should be understood that, the disclosed system, apparatus, and method may be implemented in other manners. For example, a foregoing described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may be or may not be physically separate, and components displayed as units may be or may not be physical units, that is, may be located in one place or distributed on a plurality of network units. Some or all of the units may be selected based on actual requirements to achieve the objective of a solution of embodiments.

In addition, functional units in embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A wireless communication method, comprising:
    determining, by a positioning device in a core network, a first time period, wherein
    a time domain position of the first time period is associated with a time domain position of a second time period, wherein the first time period is located adjacent to the second time period, and that the first time period is located adjacent to the second time period comprises at least one of the following:
        the first time period and the second time period form a continuous time period; or
        a time interval between the first time period and the second time period is less than or equal to a first threshold, wherein the first threshold is less than or equal to: $\alpha T/N+\sigma$, T is a paging cycle, and N is a quantity of paging frames in one paging cycle; $\alpha=1$ or $\alpha$ is predefined by a protocol, and $\sigma$ is determined based on a higher layer parameter; and
    the first time period is associated with positioning measurement or sounding reference signal (SRS) transmission, and the second time period is associated with paging detection.

2. The method according to claim 1, wherein the time interval between the first time period and the second time period is one of following time intervals:
    a time interval between a starting time of the first time period and a starting time of the second time period;
    a time interval between the starting time of the first time period and an ending time of the second time period;
    a time interval between an ending time of the first time period and the starting time of the second time period; and
    a time interval between the ending time of the first time period and the ending time of the second time period.

3. The method according to claim 1, wherein the first threshold is predefined by a protocol; or the first threshold is determined based on a transition time between an out-of-synchronization status and a synchronization status.

4. The method according to claim 3, wherein the transition time is received by the positioning device by using long term evolution positioning protocol (LPP) signalling.

5. The method according to claim 1, wherein the first time period is determined based on first information, and the first information comprises at least one of following information:
    second information, associated with the paging detection; or
    third information, indicating a time period capable of being used for positioning measurement or SRS transmission.

6. The method according to claim 5, wherein the second information comprises at least one of following information:
    a paging cycle;
    a discontinuous reception (DRX) cycle of a terminal device;
    a frame offset of a paging frame;
    a quantity of paging frames comprised in the paging cycle;
    an identity of the terminal device;
    a position of the paging frame;
    a transition time between an out-of-synchronization status and a synchronization status; or
    a position of a paging occasion.

7. The method according to claim 5, wherein the second information is received by the positioning device from a target device, wherein the target device is a base station corresponding to a serving cell, a terminal device, or another device in the core network.

8. The method according to claim 5, wherein the third information comprises at least one of a starting point or a length of the time period capable of being used for positioning measurement or SRS transmission.

9. A wireless communication method, comprising:
    transmitting, by a terminal device or a base station, first information to a positioning device in a core network, wherein
    the first information is used to determine a first time period, and a time domain position of the first time period is associated with a time domain position of a second time period, wherein the first time period is located adjacent to the second time period, and that the first time period is located adjacent to the second time period comprises at least one of the following:
  the first time period and the second time period form a continuous time period; or
  a time interval between the first time period and the second time period is less than or equal to a first threshold, wherein the first threshold is less than or equal to: $\alpha T/N+\sigma$, T is a paging cycle, and N is a quantity of paging frames in one paging cycle; $\alpha=1$ or $\alpha$ is predefined by a protocol, and $\sigma$ is determined based on a higher layer parameter; and
  the first time period is associated with positioning measurement or sounding reference signal (SRS) transmission, and the second time period is associated with paging detection.

10. The method according to claim 9, wherein the time interval between the first time period and the second time period is one of following time intervals:
  a time interval between a starting time of the first time period and a starting time of the second time period;
  a time interval between the starting time of the first time period and an ending time of the second time period;
  a time interval between an ending time of the first time period and the starting time of the second time period; and
  a time interval between the ending time of the first time period and the ending time of the second time period.

11. The method according to claim 9, wherein the first threshold is predefined by a protocol; or the first threshold is determined based on a transition time between an out-of-synchronization status and a synchronization status.

12. The method according to claim 9, wherein the first information is transmitted by the terminal device.

13. An apparatus, comprising:
  at least one processor;
  one or more non-transitory computer-readable storage media coupled to the at least one processor and storing programming instructions for execution by the at least one processor, wherein the programming instructions, when executed, cause the apparatus to perform operations comprising:
  determining a first time period, wherein
  a time domain position of the first time period is associated with a time domain position of a second time period, wherein the first time period is located adjacent to the second time period, and that the first time period is located adjacent to the second time period comprises at least one of the following:
    the first time period and the second time period form a continuous time period; or
    a time interval between the first time period and the second time period is less than or equal to a first threshold, wherein the first threshold is less than or equal to: $\alpha T/N+\sigma$, T is a paging cycle, and N is a quantity of paging frames in one paging cycle; $\alpha=1$ or $\alpha$ is predefined by a protocol, and $\sigma$ is determined based on a higher layer parameter; and
    the first time period is associated with positioning measurement or sounding reference signal (SRS) transmission, and the second time period is associated with paging detection.

14. The apparatus according to claim 13, wherein the time interval between the first time period and the second time period is one of following time intervals:
  a time interval between a starting time of the first time period and a starting time of the second time period;
  a time interval between the starting time of the first time period and an ending time of the second time period;
  a time interval between an ending time of the first time period and the starting time of the second time period; and
  a time interval between the ending time of the first time period and the ending time of the second time period.

15. The apparatus according to claim 13, wherein the first threshold is predefined by a protocol; or the first threshold is determined based on a transition time between an out-of-synchronization status and a synchronization status.

16. The apparatus according to claim 15, wherein the transition time is received by using long term evolution positioning protocol (LPP) signalling.

17. The apparatus according to claim 13, wherein the first time period is determined based on first information, and the first information comprises at least one of following information:
  second information, associated with the paging detection; or
  third information, indicating a time period capable of being used for positioning measurement or SRS transmission.

18. The apparatus according to claim 17, wherein the second information comprises at least one of following information:
  a paging cycle;
  a discontinuous reception (DRX) cycle of a terminal device;
  a frame offset of a paging frame;
  a quantity of paging frames comprised in the paging cycle;
  an identity of the terminal device;
  a position of the paging frame;
  a transition time between an out-of-synchronization status and a synchronization status; or
  a position of a paging occasion.

19. The apparatus according to claim 17, wherein the second information is received from a target device, wherein the target device is a base station corresponding to a serving cell, a terminal device, or another device in a core network.

20. The apparatus according to claim 17, wherein the third information comprises at least one of a starting point or a length of the time period capable of being used for positioning measurement or SRS transmission.

* * * * *